US006705812B1

(12) United States Patent
Benedict et al.

(10) Patent No.: US 6,705,812 B1
(45) Date of Patent: Mar. 16, 2004

(54) STANCHION AND CLAMP ASSEMBLIES FOR STORAGE AND DUNNAGE SYSTEMS

(76) Inventors: Charles E. Benedict, 3207 Remington Run, Tallahassee, FL (US) 32312; William P. Thompson, 2431 Oakdale St., Tallahassee, FL (US) 32312; Stephen R. Corbett, 2425 Lanrell Dr., Tallahassee, FL (US) 32301; James R. Dobbs, 3122 Cabot Rd., Tallahassee, FL (US) 32312; Scott K. Bladen, 1842 Bridgemont Trail, Tallahassee, FL (US) 32312

( * ) Notice: Subject to any disclaimer, the term of this patent is extended or adjusted under 35 U.S.C. 154(b) by 37 days.

(21) Appl. No.: 10/040,946

(22) Filed: Jan. 9, 2002

Related U.S. Application Data

(60) Provisional application No. 60/260,227, filed on Jan. 9, 2001.

(51) Int. Cl.$^7$ ................................................. B61D 45/00
(52) U.S. Cl. ........................ 410/153; 410/143; 410/144; 410/150
(58) Field of Search ................................. 410/144, 145, 410/143, 149, 150, 151, 153; 74/141.5, 143, 167; 211/105.3, 105.5, 105.6; 248/354.5, 354.6, 354.7; 254/12, 95, 112

(56) References Cited

U.S. PATENT DOCUMENTS

| | | | | | |
|---|---|---|---|---|---|
| 1,570,226 | A | * | 1/1926 | Bosco | 254/104 |
| 1,936,596 | A | * | 11/1933 | Goebert | 254/95 |
| 2,336,440 | A | * | 12/1943 | Kass | 105/370 |
| 2,616,375 | A | * | 11/1952 | Nampa | 410/144 |
| 3,062,157 | A | * | 11/1962 | Woods | 410/149 |
| 4,121,849 | A | * | 10/1978 | Christopher | 410/38 |
| 4,208,970 | A | * | 6/1980 | Matyas | 410/153 |
| 4,294,569 | A | * | 10/1981 | Lewis et al. | 410/133 |
| 5,094,576 | A | * | 3/1992 | Fredelius | 410/151 |
| 5,944,464 | A | * | 8/1999 | Cole, Jr. | 410/153 |
| 5,971,685 | A | * | 10/1999 | Owens | 410/151 |
| 5,988,962 | A | * | 11/1999 | Santa Cruz et al. | 410/151 |
| 6,068,433 | A | * | 5/2000 | Baloga | 410/145 |

* cited by examiner

Primary Examiner—D. Glenn Dayoan
Assistant Examiner—Paul Chenevert
(74) Attorney, Agent, or Firm—Ralph A. Dowell; Dowell & Dowell P.C.

(57) ABSTRACT

Stanchion and clamp assemblies which are moveable along a track system in a cargo storage area and which are extendably adjustable relative to cargo or dunnage after being fixedly secured to the track system to thereby permit positive engagement of the stanchion and clamp assemblies with the cargo or dunnage and thus prohibit cargo dunnage shifting.

24 Claims, 14 Drawing Sheets

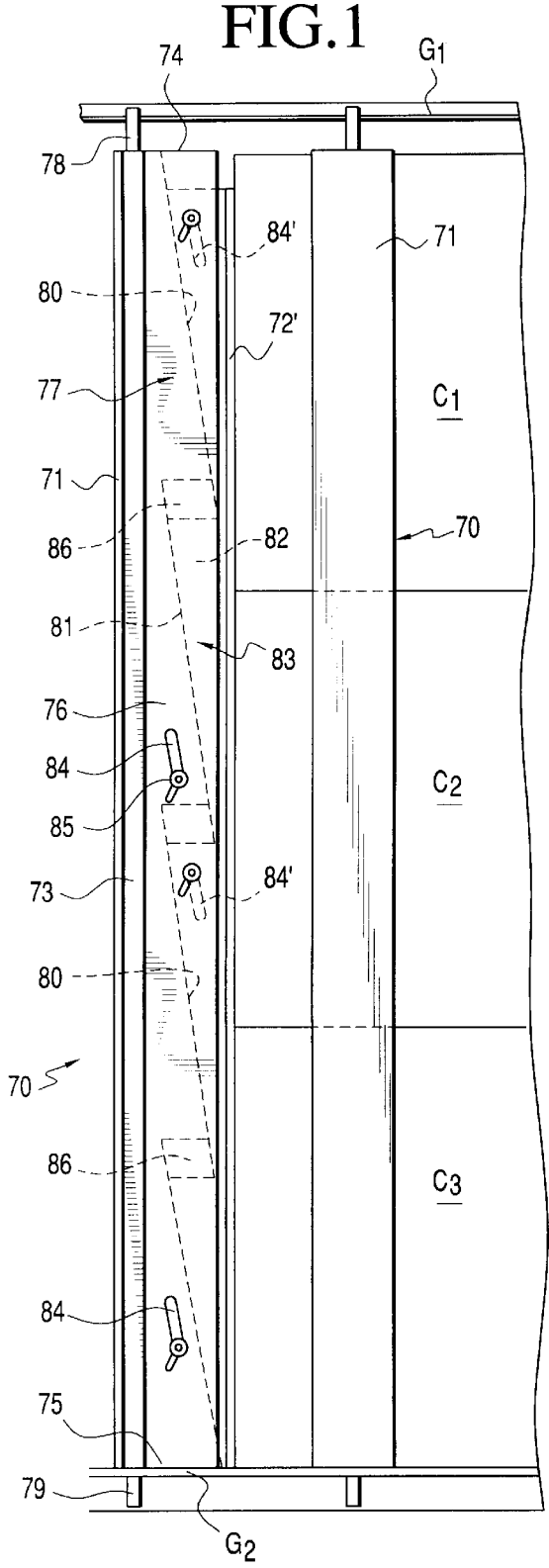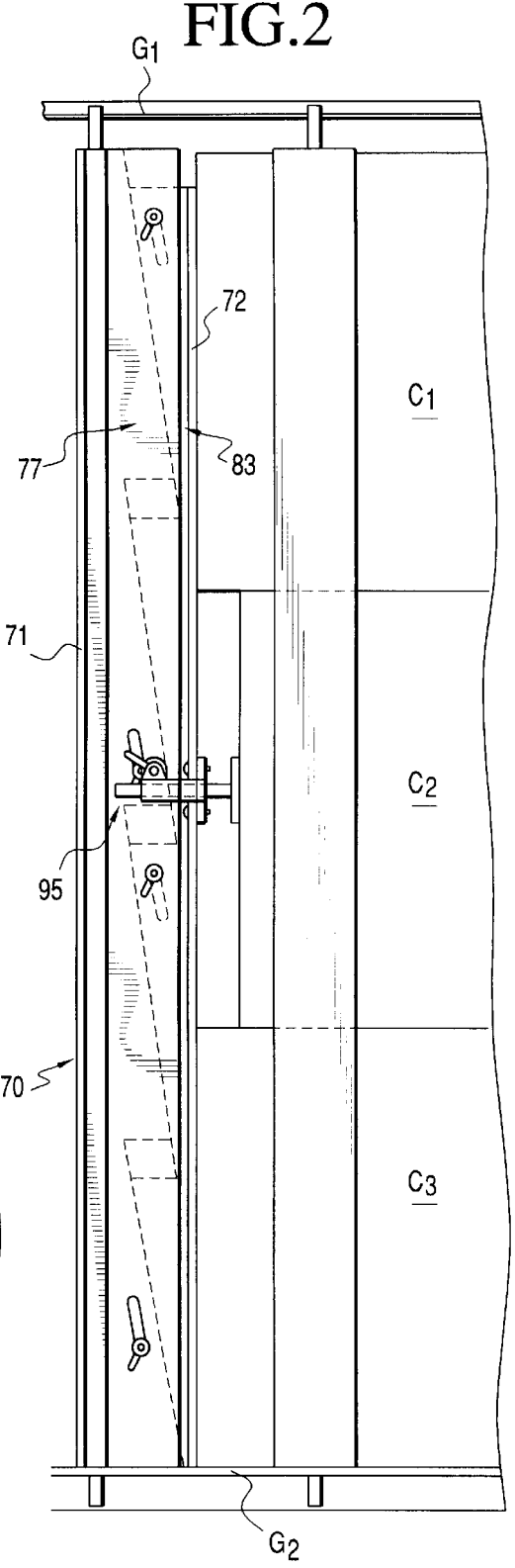

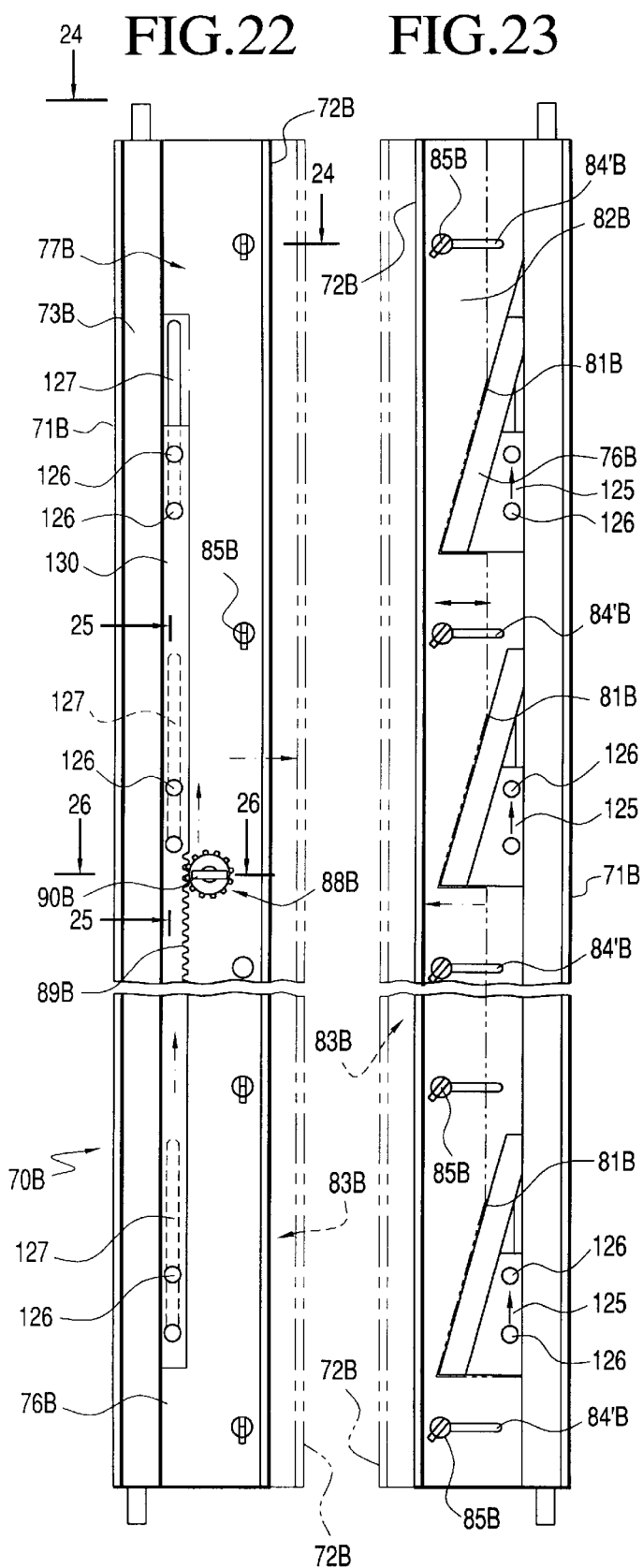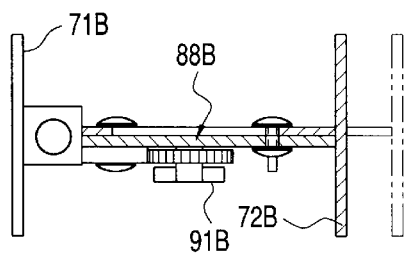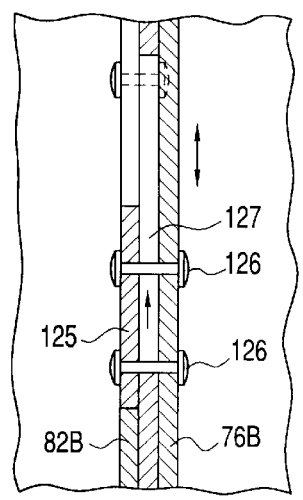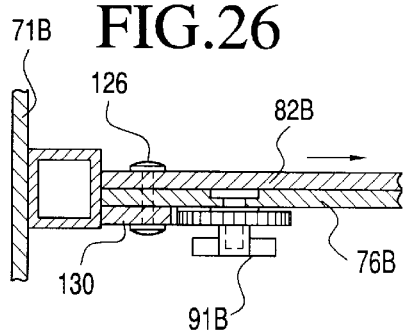

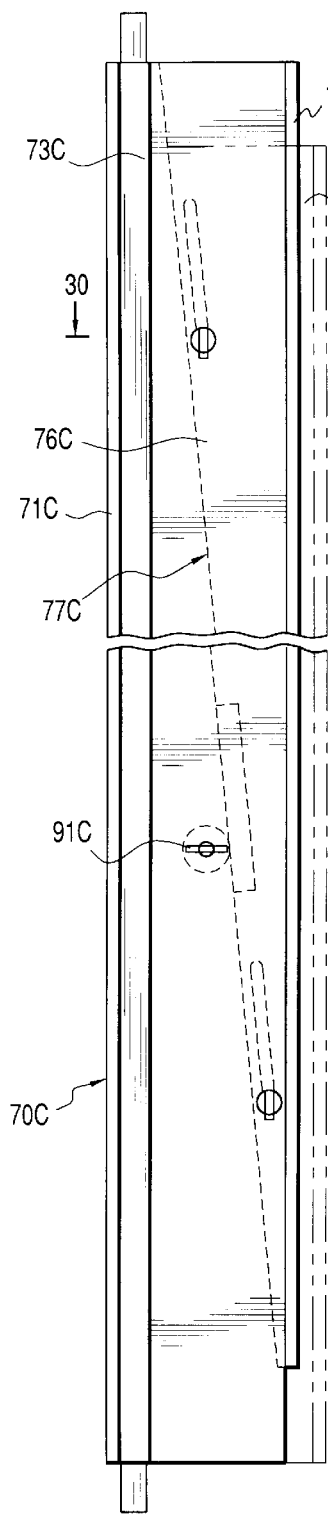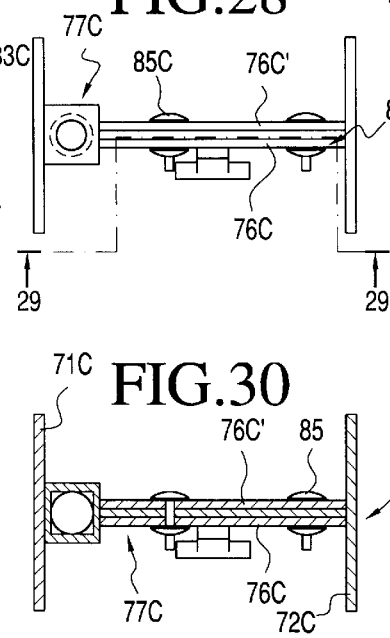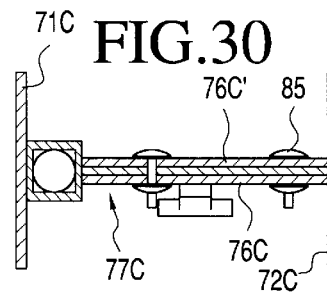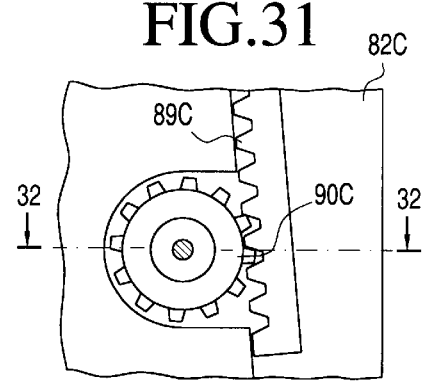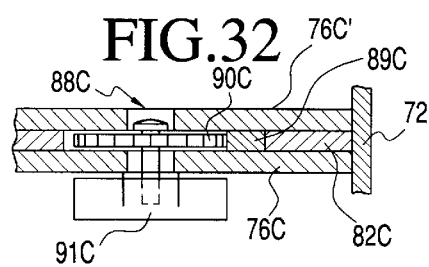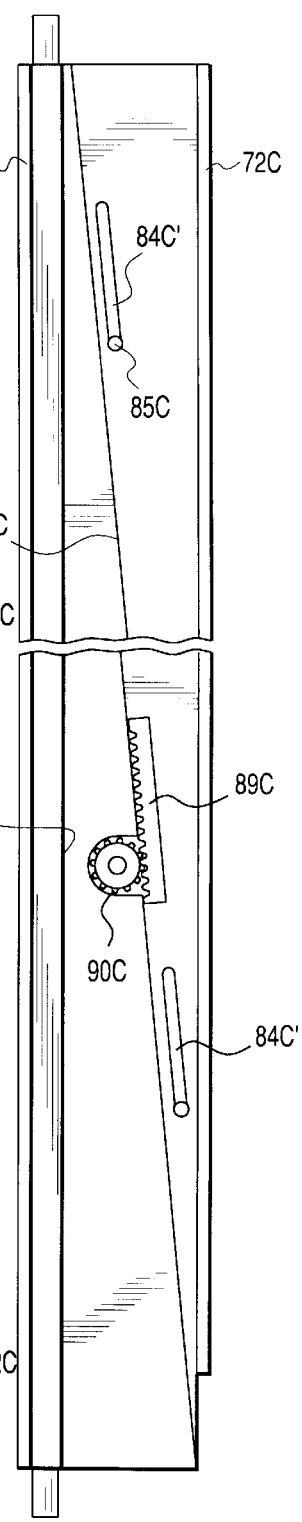

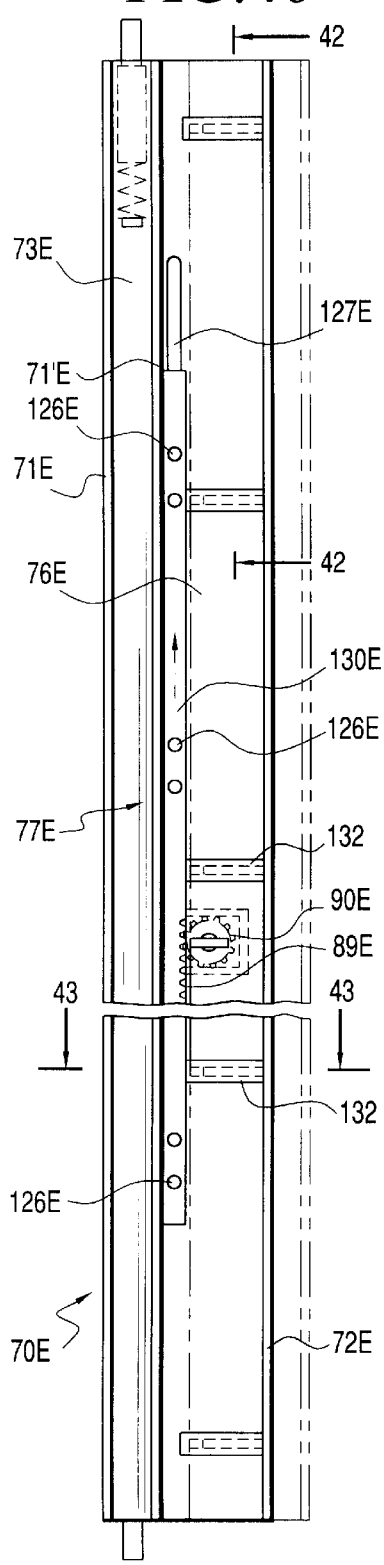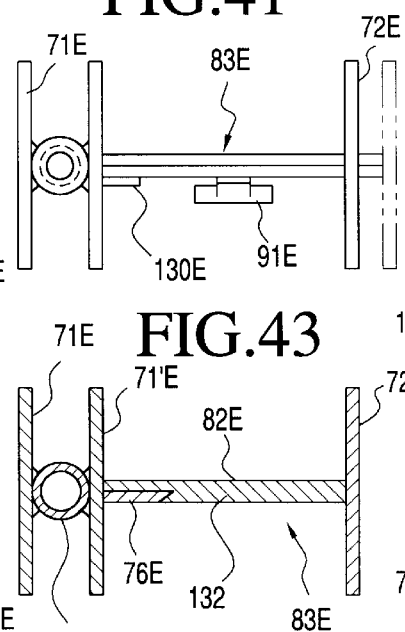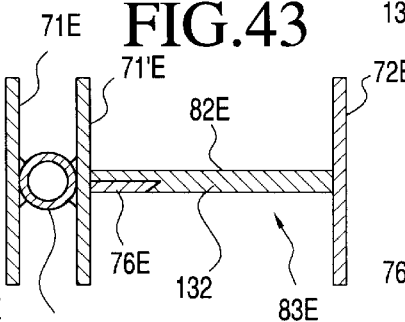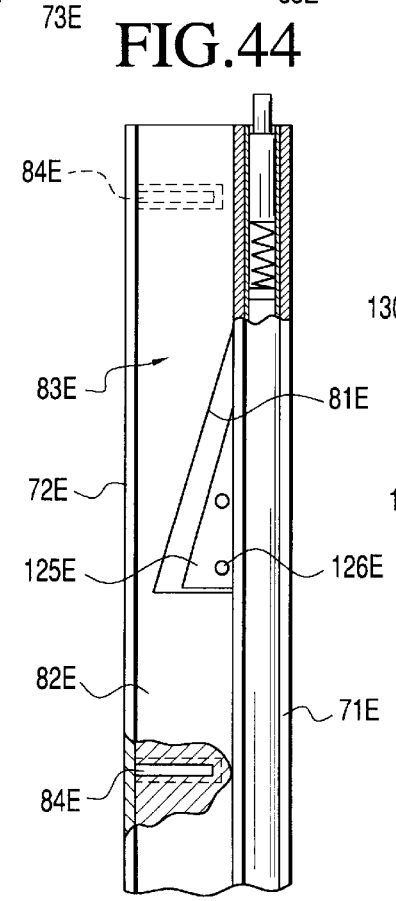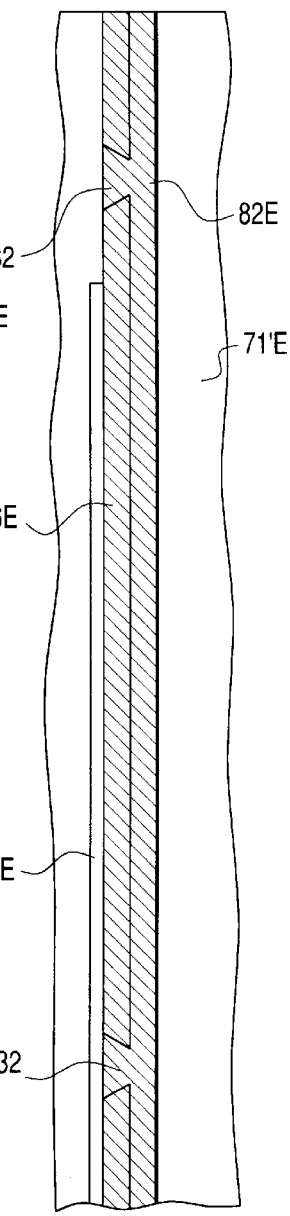

STANCHION AND CLAMP ASSEMBLIES FOR STORAGE AND DUNNAGE SYSTEMS

CROSS REFERENCE TO RELATED APPLICATION

This application claims the benefit of U.S. Provisional Patent Application Serial No. 60/260,227 which was filed on Jan. 9, 2001, entitled STANCHION AND CLAMP ASSEMBLIES FOR STORAGE AND DUNNAGE SYSTEMS with the same inventors.

BACKGROUND OF THE INVENTION

Field of the Invention

This invention is generally directed to stanchions and load clamping devices for use in securing storage or cargo in transport vehicles including ships, aircraft, trucks and the like. More specifically, the invention is directed to stanchion assemblies which are adjustable along guide tracks within a storage area wherein horizontal adjustment of each stanchion is possible after being locked relative to the guide tracks to thereby ensure complete and safe restraint of cargo regardless of movement of the carrier.

SUMMARY OF THE INVENTION

The present invention is directed to stanchion and clamp assemblies which are used in cooperation with upper and lower generally aligned guide tracks which are provided within a cargo storage or holding area and wherein in some embodiments, the tracks define lines of movement for the stanchions relative to stored cargo. In a basic structure, the stanchions include vertical extending body members having locking pins or other locking elements extending from upper and lower ends thereof so as to engage within openings provided along the tracks within the cargo storage area. Each stanchion further includes an adjustable member which is extendible horizontally relative to a fixed body member when the stanchion has been locked into place relative to the guide tracks with such extendible member being moveable by a mechanical adjusting mechanism which not only controls the degree of extension but also retains the extendible member in adjusted position during use.

In one preferred embodiment, the stanchion is formed having two vertical members each having a plurality of inclined and opposing faces which are slidably engageable with respect to one another. The guide track locking elements extend outwardly from the upper and lower portions of one of the body members such that the one body member may be locked into position relative to the guide tracks. Thereafter, an adjustment mechanism connected between the two body members is operable to extend the other or extendible body member outwardly in a generally horizontal direction with respect to the fixed member. Due to the sliding engagement of the inclined surfaces of the two body members, the adjustable body member will slide outwardly having a component of vertical movement thereto depending upon the degree of inclination of the interfaces between the two members. In use, the stanchion is moved into as close a locking position as possible to the cargo along the tracks of the cargo storage area. Thereafter, the fixed stanchion member is locked into position by extending locking pins, or other locking devices, from the upper and lower ends thereof into openings in the tracks. Final adjustment to allow the stanchion to positively and firmly engage the cargo to retain it in place is accomplished by extending the extendible body member outward and either upwardly or downwardly relative to the fixed member until an outer face thereof firmly engages the cargo.

To ensure secure engagement of the stanchions of the present with respect to stacked cargo, the present invention also provides for horizontally adjustable clamp assemblies to be mounted to selected portions of the stanchions. In a preferred embodiment, the stanchions are provided with a plurality of support pins or holes in side surfaces or flanges thereof which are used to support clamp mechanisms at a selected vertical height. The clamp mechanisms are suspended from the stanchions and include clamp plates which are moveable with respect to support brackets by appropriate mechanical adjustment mechanisms, such as rachet or gear assemblies, which may be locked to retain the outer plates in fixed position against cargo which is not vertically aligned with respect to other cargo in a stack. Thus, when the stanchions are placed against cargo which is stacked, in the event any cargo is not uniformly aligned, the adjustable clamps are secured to the stanchions and adjusted to thereby engage the non-aligned cargo to retain it in fixed position.

In other embodiments of the present invention, the stanchions include adjustment mechanisms which provide for only a horizontal adjustment of the extendible body members relative to the fixed body members once placed in position adjacent cargo.

In some embodiments, the stanchions may be suspended from carriages or carriers which are mounted within the guide tracks defining the ceiling tracks of the storage area or supported by carriers movable within the guide tracks along the floor of the storage area. Using carriers to support each stanchion allows the entire weight of the stanchions to be borne by the tracks thus enabling individuals to easily shift and maneuver the stanchions in a cargo storage area.

In other embodiments of the present invention, the tracks which guide the stanchions may be provided with opposing teeth positioned on opposite side of central channels. The stanchions, as opposed to including locking pins, may include locking elements having outer surface configurations such that they are engageable with the teeth defined by the tracks when extended outwardly either upwardly or downwardly relative to the upper and lower ends of the stanchions.

In yet further embodiments of the present invention, the stanchions may be supported not only by upper carriers mounted within the upper guide tracks within the storage area but may also be supported by lower carriers which are mounted within the guide tracks along the floor, deck or supporting base surface of a cargo storage area.

It is the primary object of the present invention to provide stanchions which may be used in substantially any cargo storage area to prevent cargo from shifting during movement of a transport vehicle including ships, airplanes, trucks and the like, wherein the stanchions are used in cooperation with upper and lower guide tracks having openings or configurations which permit a selective locking of the stanchions relative to the tracks and wherein the stanchions have components or members which are adjustable horizontally after the stanchions have been initially positioned relative to cargo such that the adjustable members of the stanchions can be extended to securely engage cargo and retain it in position.

It is also an object of the present invention to provide stanchions which may be utilized with adjustable clamp members such that stacked cargo can be securely engaged when the cargo is not vertically aligned whereby the stanchions may be engaged against portions of the stacked cargo and the clamp assemblies supported by the stanchions to engage portions of the cargo which are not vertically aligned.

It is also an object of the present invention to provide a system of stanchions for use in carrier storage areas and especially in areas where heavy cargo is stored such as in military ships wherein missiles, bombs and other devices must be safely and securely stored, wherein the stanchions may be easily moved and manipulated by a single individual and positioned and locked relative to the cargo in such a manner that the cargo can not shift during movement of the carrier.

BRIEF DESCRIPTION OF THE DRAWINGS

A better understanding of the invention will be had with respect to the attached drawings wherein:

FIG. 1 is a side illustrational view of a first embodiment of stanchion in accordance with the teachings of the present invention showing the stanchion engaging the side of stacked cargo;

FIG. 2 is a view similar to FIG. 1 wherein a portion of the stacked cargo is out of vertical alignment and showing the use of an adjustable locking clamp with the stanchion of FIG. 1 to engage the cargo which is out of alignment;

FIG. 22 is a right side view of a third embodiment of stanchion in accordance with the teachings of the present invention;

FIG. 23 is a left side view of the stanchion of FIG. 22;

FIG. 24 is a partial cross-sectional view taken along the line 24—24 of FIG. 22;

FIG. 25 is a cross-sectional view taken along line 25—25 of FIG. 22;

FIG. 26 is a partial cross-sectional view taken along line 26—26 of FIG. 22;

FIG. 27 is another embodiment of stanchion in accordance with the teachings of the present invention taken from the right side;

FIG. 28 is a top plan view of the stanchion of FIG. 27;

FIG. 29 is a view taken along line 29—29 of FIG. 28;

FIG. 30 is a cross-sectional view taken along line 30—30 of FIG. 27;

FIG. 31 is an enlarged view of an adjustment mechanism shown in FIG. 29;

FIG. 32 is a partial cross-sectional view taken along line 32—32 of FIG. 31;

FIG. 40 is a right side view of another embodiment of stanchion in accordance with the teachings of the present invention;

FIG. 41 is a top plan view of the stanchion of FIG. 40;

FIG. 42 is an enlarged view taken along line 42—42 of FIG. 40;

FIG. 43 is a cross-sectional view taken along line 43—43 of FIG. 40;

FIG. 44 is a partial cross-sectional view showing the upper locking pin of the stanchion of FIG. 40.

DESCRIPTION OF THE PREFERRED EMBODIMENTS

Figure 55:
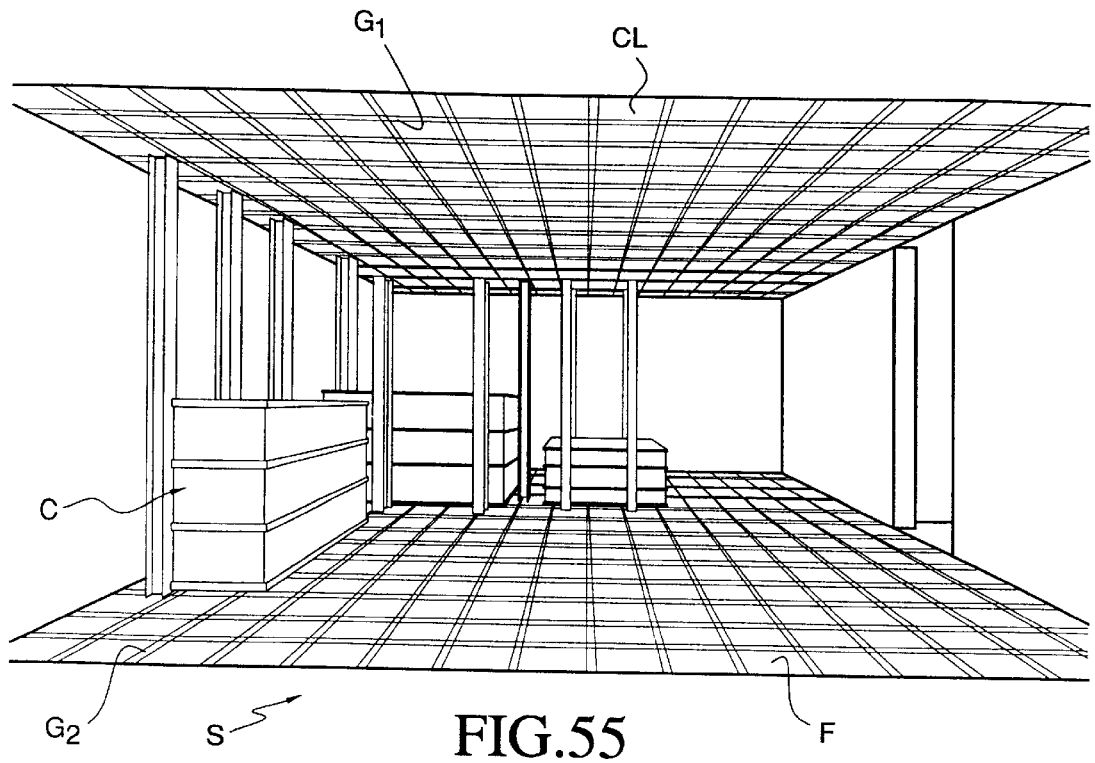
FIG. 55 is a perspective illustrational view of a storage area having upper and lower guide tracks in accordance with the teachings of the present invention and showing stanchions similar to those previously described mounted to secure cargo within the storage area.
Figure 56:
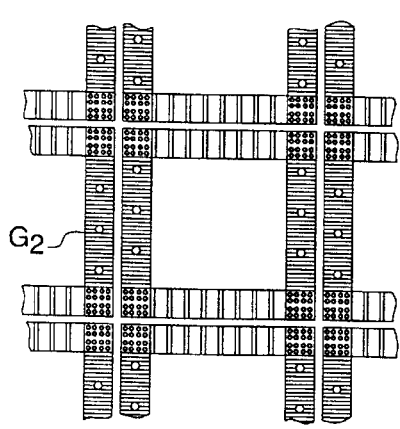
FIG. 56 is an illustration of a possible grid pattern utilizing the guide tracks of the present invention.
Figure 57:
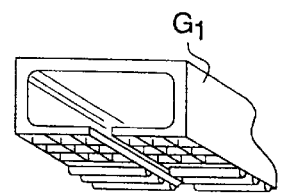
FIG. 57 is a front perspective view of one example of a configuration for an upper guide track of the present invention.
Figure 58:
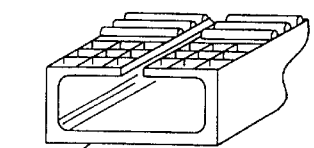
FIG. 58 is a front perspective view of one example of a lower guide track in accordance with the teachings of the present invention.

With continued reference to the drawing figures and particular FIGS. 55—58, the invention is directed to stanchions for use in securing cargo "C" within a cargo or storage area "S" of a carrier which carrier may include ships, aircraft, trucks and the like which transport cargo loads which must be secured so as not to shift or move during transport. In the preferred embodiments, the stanchions are designed to be utilized with guide tracks "G1" and "G2" which are provided in an intersecting pattern along the ceiling "CL" and the floor "F" of the storage area. In some of the embodiments of the invention, the tracks may be generally c-shaped as shown in FIGS. 57 and 58 so as to allow shuttles, carriers or carriages, as will be described in detail herein, to travel within the guide tracks in order to support the stanchions of the invention either from the upper, lower or both of the upper or lower guide tracks. As shown in FIGS. 55 and 56, the guide tracks are provided in the storage area in a uniform pattern, with the embodiment shown being laid out in generally square configurations.

It should be noted that the configuration of the guide tracks and the orientation of the guide tracks may vary and yet be within the teachings of the invention. It is only necessary to provide a system which will permit placement and/or movement of stanchions mounted to the upper and lower guide tracks "G1" and "G2", such that the stanchions may be moved to various locations throughout a storage area "S".

Figure 47:
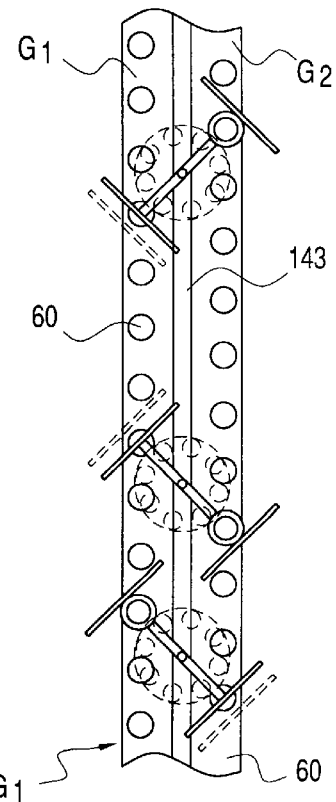
FIG. 47 is an illustrational view of the stanchion of FIG. 45 showing the stanchion in different positions along the guide track and illustrating in dotted line the position of the extension member of the stanchion and also showing locking holes in the guide track.

In preferred embodiments of the invention, the guide tracks include spaced locking holes or openings 60 which are provided in opposite flanges 61 and 62 defined by the guide tracks or rails "G1" and "G2". In FIG. 47, the view is toward the openings in the upper guide track "G1". Similar openings are provided in the lower guide track "G2" in the preferred embodiments.

The guide rails or tracks of the invention need not be separately formed but may be formed as part of the ceiling or floor structure of the storage area. In this respect, the floor and ceiling may be formed of panels defining a series of open channels in a grid pattern similar to that as shown in drawing FIGS. 54, 55 and 56 and where necessary, openings such as shown at 60 in FIG. 47 may be made directly on opposite sides of the channels defined in the floor and/or ceiling structure.

The invention is directed to providing adjustable stanchions which are used to replace more conventional non-adjustable stanchions, wooden dunnage, wooden wedges, chains, straps and other tie-downs utilized in most cargo storage areas. The stanchions of the invention are designed to accommodate wide varieties of cargo arrangements, cargo configurations and cargo weights such that the stanchions may be used for securing small goods or may be used in military vessels for anchoring heavy loads such as missile containers, bomb clusters, pallets of machinery and the like without fear of the stanchions failing during use.

Among other unique features of the invention, the stanchions are constructed such that they operate as expandible structures for purposes of securing cargo. In this respect, the stanchions of the invention are designed to be maneuvered closely adjacent cargo and secured. Thereafter, the stanchions are adjusted such that a surface of the stanchions is moveable to positively engage and secure cargo in place. By way of example, considering a stanchion having a cross-section of an "I" beam. The "I" beam has a front cargo engaging flange and a rear flange, which in some instances may also engage cargo, and which flanges are connected by a central web. In the invention, a portion of the central web and the cargo engaging face or flange are designed to be expandible such that the cargo engaging flange is movable horizontally after a stanchion is initially secured in place to thereby engage cargo within a storage area. It should be noted that the stanchions may have differing cross-sectional configurations with the "I" beams structures being shown only by way of example. The stanchions may be of expandible box beam or other configuration.

With specific reference to FIGS. 1–16, a first embodiment of the present invention is disclosed in detail. In this embodiment, the stanchion 70 is in the form of a split "I" beam configuration having an rear flange 71 and a spaced outer or cargo contacting flange 72 which is designed to abut cargo such as shown at "C1", "C2" and "C3" in the drawing figures. The rear flange 71 of the stanchion is integrally formed or welded to an elongated hollow channel member 73 which extends from the top 74 to the bottom 75 of the stanchion. An elongated central web 76 extends from the channel member 73 toward the cargo engaging flange 72. The rear flange 71, channel 73 and web 76 define a first member 77 of the stanchion which is defined as a fixed member of the stanchion when the stanchion is placed into use, as shown in the drawing figures. In this respect, the fixed member of the stanchion 77 includes upper and lower locking pins 78 and 79 which are designed to be seated with openings defined with the upper and lower guide tracks "G1" and "G2". The locking pins 78 and 79 may be spring loaded as will be described with respect to some embodiments in order to be yieldable to allow placement of the stanchion into position or may be manually extendable when the stanchion is moved to a desired position. It is the function of the locking pins 78 and 79 to retain the fixed member 77 of the adjustable stanchions in position relative to the guide tracks "G1" and "G2" and in close proximity to stacked cargo "C1", "C2" and "C3".

In the present embodiment, the web 76 is formed including a series of inner inclined surfaces 80 which are cooperatively engaged by reversely inclined surfaces 81 of an inner surface of a web 82 of an extendible member 83 of the stanchion 70. As previously noted, stanchions of the present invention provide for horizontal expansion of the extendible member after the fixed member 77 of the stanchion is locked with respect to the guide tracks "G1" and "G2". In the present embodiment, the cargo contacting flange 72 is integrally formed or welded to the web 82. Because of the engagement of the inclined surfaces 80 and 81 of the webs 76 and 82, there will be a vertical component of movement to the extendible stanchion member 83 as it moves horizontally in a sliding motion relative to the fixed stanchion member 77. However, because of the sliding interface, a substantial area of contact remains between the webs 76 and 82 thereby maintaining a substantial rigidity to the overall structure of the stanchion which allows the stanchion to be used to secure loads of extremely heavy weight as any force against the stanchion is resisted by a substantially rigid inner web formed by the sliding web elements 76 and 82.

To connect the fixed stanchion member 77 to the adjustable or extendible stanchion member 83, aligned and angled slots 84 and 84' are provided in each of the webs 76 and 82 through which guide or locking pins 85 are seated.

As noted with specific reference to FIGS. 1–5, the outer surfaces defined by the webs 76 and 82 conceal the inner beveled or inclined edges 80 and 81 therebetween such that an individual can not accidentally place a finger between the sliding surfaces into spaces, such as shown at 86 in FIG. 1, which are created between the inclined edges when the extendible stanchion member is moved relative to the cargo.

Figure 6:
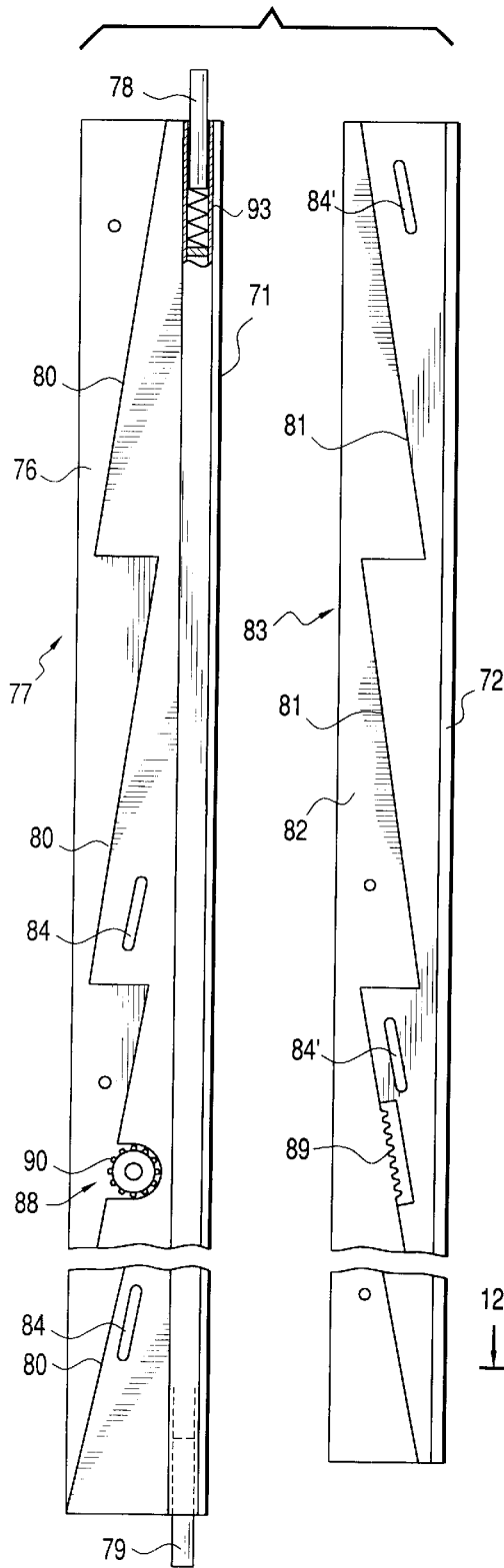
FIG. 6 is an assembly view showing tapered engaging edges of the fixed member of the stanchion and the extendible member of the stanchion, as shown in FIG. 1.
Figure 7:
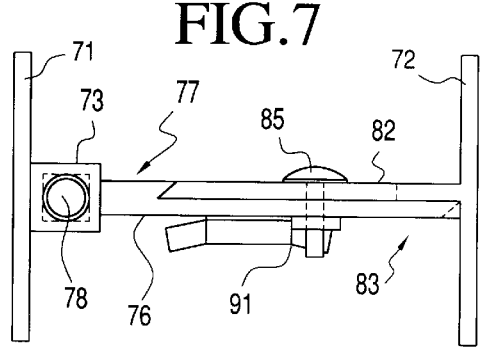
FIG. 7 is a top plan view of the stanchion as shown in FIG. 3.
Figure 8:
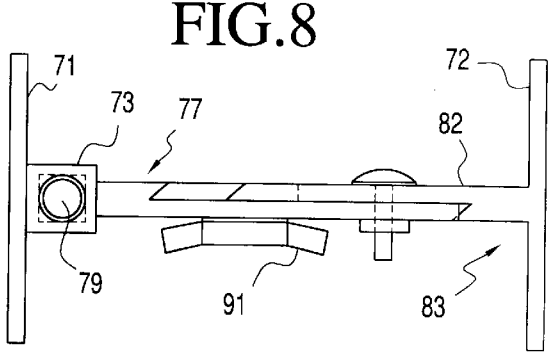
FIG. 8 is a bottom plan view of the stanchion shown in FIG. 3.
Figure 9:
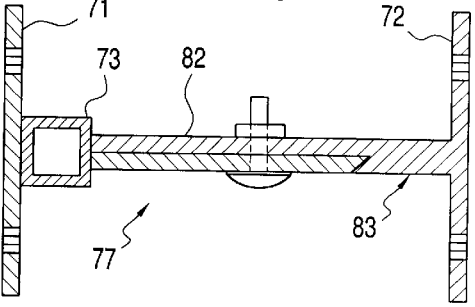
FIG. 9 is a cross-sectional view taken along line 9—9 of FIG. 3.
Figure 10:
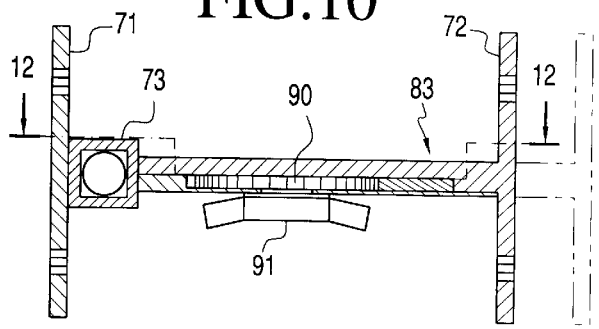
FIG. 10 is a cross-sectional view taken along line 10—10 of FIG. 3.
Figure 11:
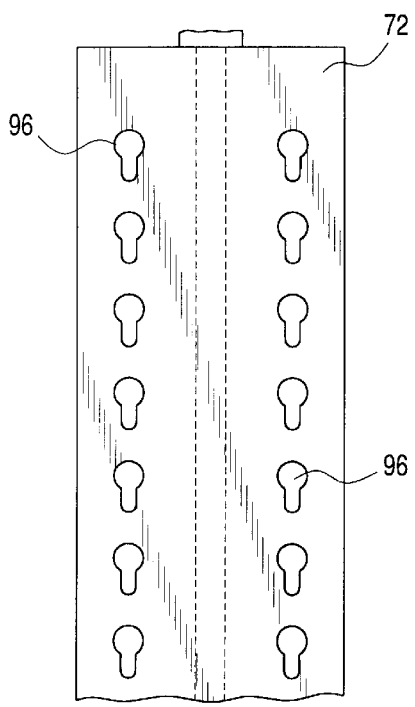
FIG. 11 is a view taken along lines 11—11 of FIG. 3 showing a portion of a cargo engaging face of the extendible member of the stanchion.
Figure 12:
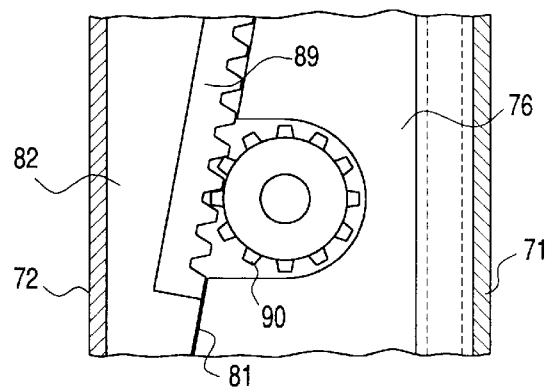
FIG. 12 is a cross-sectional view taken along line 12—12 of FIG. 10.
Figure 13:
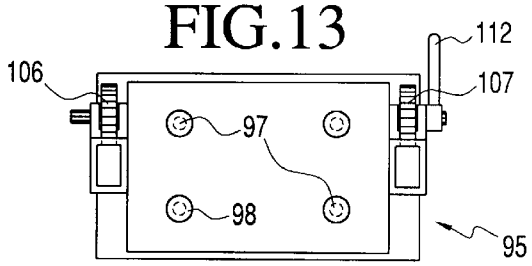
FIG. 13 is a rear elevational view of an adjustable clamp assembly which is designed to be mounted to the stanchion of the present invention.
Figure 14:
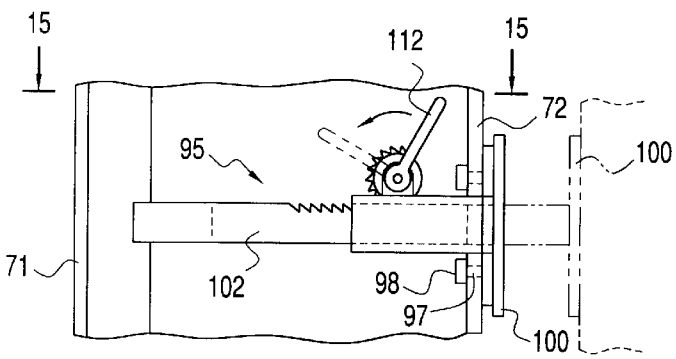
FIG. 14 is a right side view of the clamp of FIG. 13 shown mounted to the extendible member of the stanchion of FIG. 2.
Figure 16:
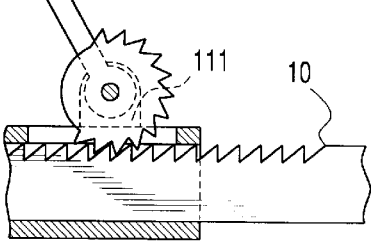
FIG. 16 is an enlarged cross-sectional view taken along line 16—16 of FIG. 15.
Figure 15:
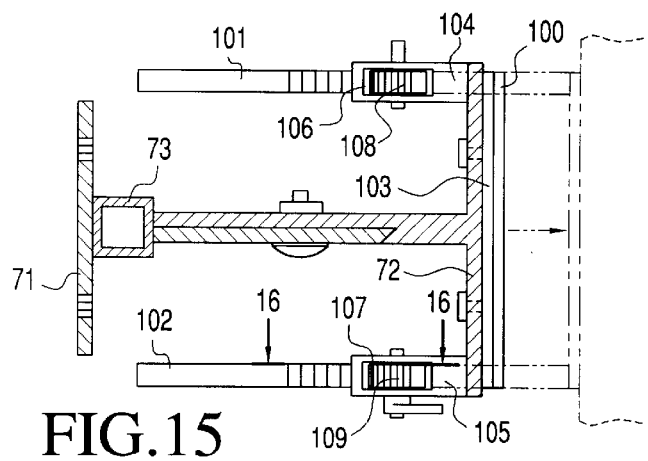
FIG. 15 is a cross-sectional view taken along line 15—15 of FIG. 14.
Figure 17:
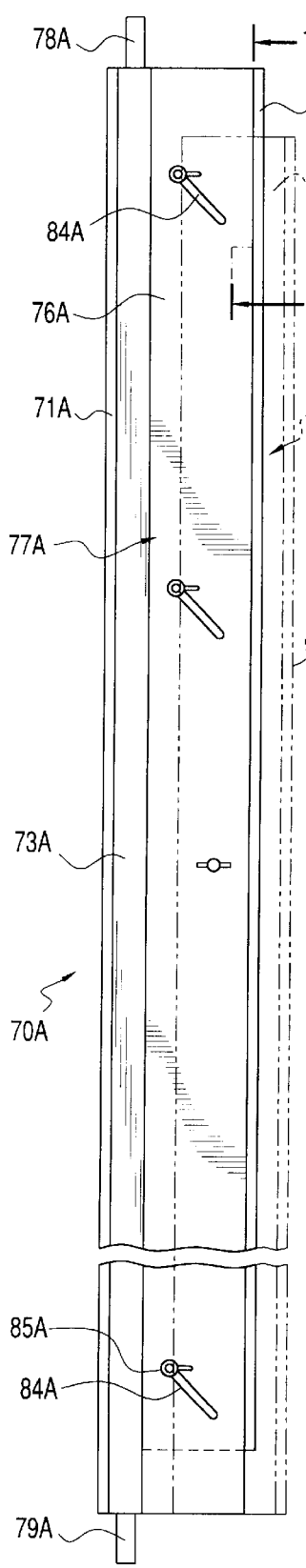
FIG. 17 is a right side view of a second embodiment of stanchion in accordance with the teachings of the present invention showing a movement of the extendible member of the stanchion in dotted line.
Figure 18:
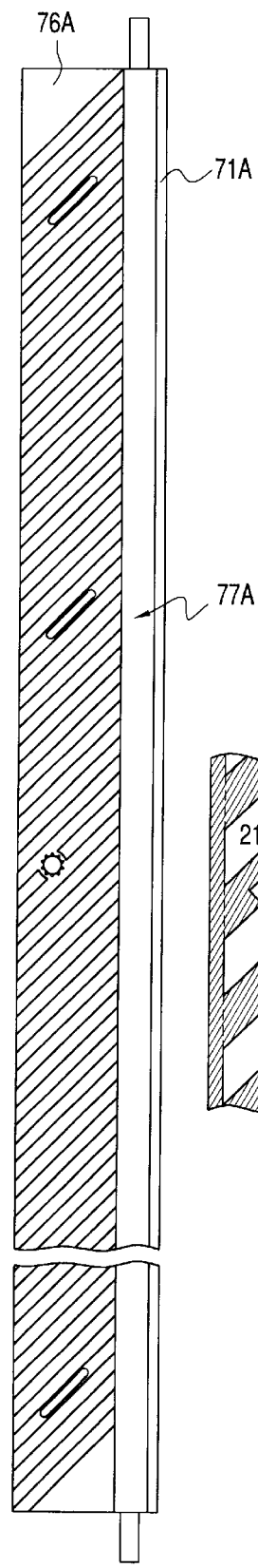
FIG. 18 is a view of an inner face portion of a fixed member of the stanchion shown in FIG. 17 showing a plurality of guide grooves formed therein.

With specific reference to FIG. 6, the inner surface of the fixed stanchion member 77 and the extendible stanchion member 83 is shown. It is noted that the webs 76 and 82 are formed so as to extend between the flanges 71 and 72 when the extendible member of the stanchion is fully closed with respect to the fixed member, as is shown in FIG. 7. The inclined or beveled edges 80 and 81 are provided in the inner faces of the webs 76 and 82 so that the integrity of the webs are maintained such that they are continuous on their outer surfaces, as is shown in FIGS. 1–5.

Although various mechanical devices may be used to extend the extendible member of each of the stanchions 70 relative to the fixed member thereof, with specific reference to FIGS. 6–10 and FIG. 12, one type of adjustment mechanism 88 is shown. As shown, the adjustment mechanism 88 includes a rack 89 formed or mounted along one of the inclined edges 81 of the extendible stanchion member 83 which is engageable by a pinion gear 90 rotatably mounted to the fixed stanchion member 77. The gear 90 is operable by a handle 91 mounted exteriorly of the web 76. By rotation of the handle 91, the pinion gear 90 rotates along the rack 89 thereby either extending or retracting the extendible member 83 of the stanchion relative to the fixed member 77. Due to the combination of horizontal and vertical movement of the extendible member 83 of the stanchion relative to the fixed member 77, the vertical height of the extendible member 83 is somewhat less than that of the fixed member 77 such that when fully extended, the extendible member 83 does not extend either above or below the fixed member 77.

Figure 3:
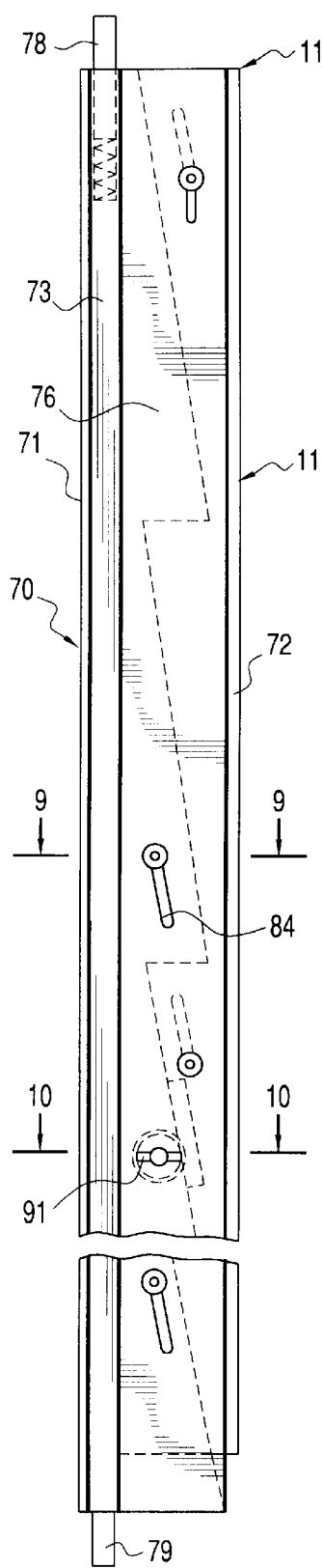
FIG. 3 is a right side elevational view of the stanchion of FIG. 1.
Figure 4:
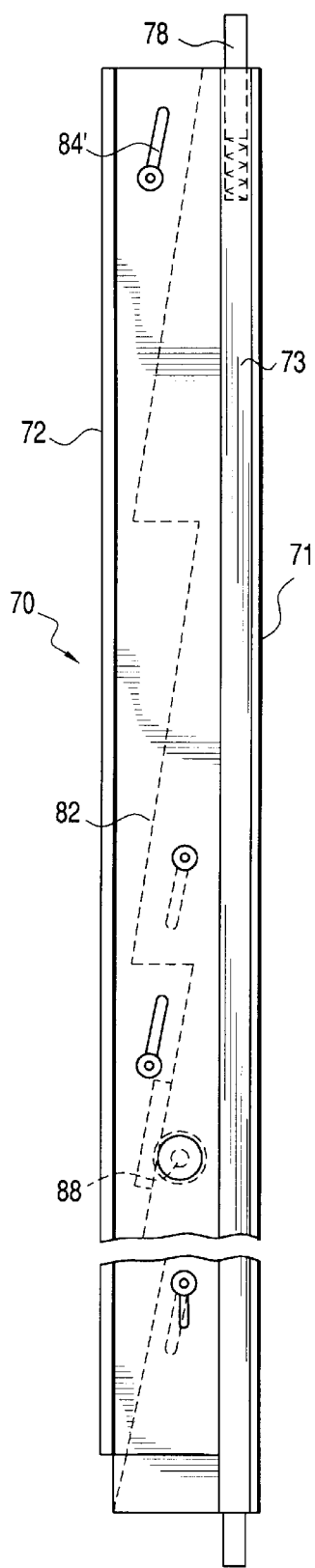
FIG. 4 is a left side elevational view of the stanchion of FIG. 1.
Figure 5:
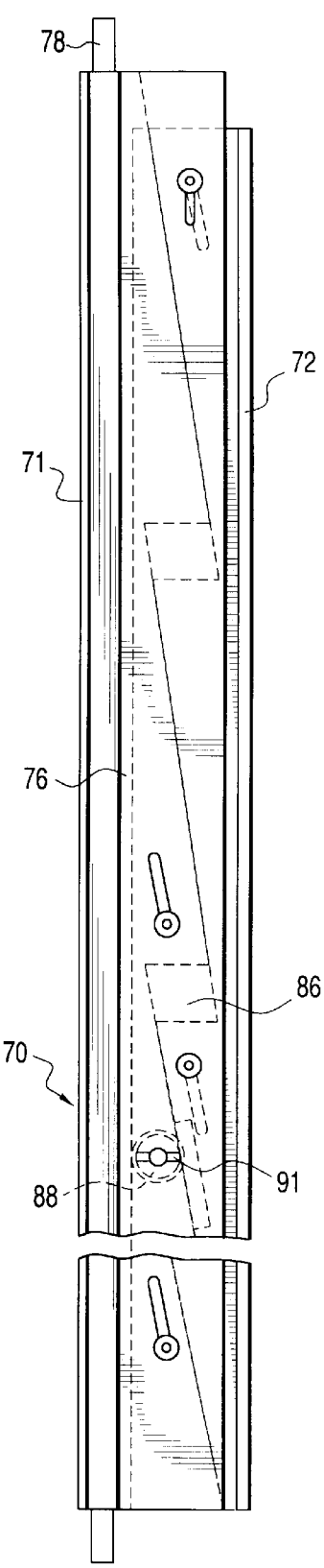
FIG. 5 is a view similar to FIG. 3 showing an extendible member of the stanchion moved outwardly with respect to a fixed member thereof.

Although the extendible member 83 is shown as being configured so as to move vertically downwardly and outwardly for extension in the drawing figures, the inclined edges of the mating webs can be reversed such that the extendible member 83 moves vertically upwardly and horizontally during adjustment. In FIG. 4, the stanchion is shown as being fully compact with the extendible member 83 seated against the fixed member of the stanchion whereas in FIG. 5, the extendible member 83 has been moved outwardly relative to the fixed member 77.

To maintain the locking pins 78 and 79 in extended position when mounted within the upper and lower guide tracks "G1" and "G2", either of the upper or lower locked pins, or both, are provided with springs 93 for urging the pins outwardly relative to the upper or lower portions of the stanchion. In the embodiment shown, the upper locking pin 78 is urged by the spring 93, as shown in FIG. 6, upwardly relative to the stanchion. Other means for extending the locking pins 78 and 79 may be provided and be within the teachings of the present invention. Other embodiments of the invention to be described will show some of the other means for such extension.

In the use of the stanchion shown at FIG. 1, the stanchion is moved to a desired position along the guide tracks "G1" and "G2". When the stanchion is adjacent to the stacked cargo "C1–C3", the locking pins are inserted into the locking holes 60. Thereafter, the adjustment mechanism is operated such as by rotating the handle 91 and the extendible member 83 of the stanchion is moved such that the flange 72 engages the cargo, as shown in FIG. 1. Although not shown in the drawing figures, separate locking devices, such as releasable pawls, can be provided for securing the adjustment mechanism in an adjusted position which pawls can be manually released in order to reverse the movement of the rack and pinion mechanism. Thereafter, the adjustment mechanism is operated such as by rotating the handle 91 and the extendible member of the stanchion is moved such that the flange 72 engages the cargo, as shown in FIG. 1. Although not shown in the drawing figures, separate locking devices, such as releasable pawls, can be provided for securing the adjustment mechanism in an adjusted position which pawls can be manually released in order to reverse the movement of the rack and pinion mechanism.

With specific reference to FIG. 2, the invention also provides for adjustable clamps 95 to be used with the stanchions to secure cargo which is not vertically aligned with other cargo when stacked as shown. In the drawing figure, the cargo container "C2" is shown as not being aligned with containers "C1" and "C3". Therefore, with the stanchion 70 in place, there is a possibility that the cargo container "C2" could move relative to the stanchion. To prevent this, the clamp assembly 95 is mounted to the extendible member 83 of the stanchion.

Although the clamp assembly 95 may be mounted in a number of ways to the stanchion 70, in a preferred embodiment, the flange 72 is provided with a plurality of sets of keyhole shaped openings 96 which are spaced along the vertical extent of the flange. In the embodiment shown, pairs of openings are provided in spaced relationship along the height of the flange.

The openings 96 are formed with enlarged upper portions and narrower lower portions such that mounting pins 97 associated with the clamp assembly 95 may be inserted with enlarged heads 98 of the pins extending through the enlarged upper portions of the openings and, thereafter, the mounting pins moved downwardly such that the enlarged heads 98 prevent the withdrawal of the mounting pins from the openings 96.

The clamp assembly 95 includes a clamping plate 100 from which extends a pair of spaced and generally parallel racks 101 and 102 having a plurality of spaced teeth associated therewith. The clamping plate 100 is moveable relative to a base plate 103 from which the mounting pins 97 extend. Also extending from the base plate 103 are a pair of open housings 104 and 105 through which the racks 101 and 102 extend, respectively. Openings 106 and 107 are provided in the upper surface of each of the housings 104 and 105, respectively, through which adjustment pinions 108 and 109 extend so as to engage the teeth of the racks 101 and 102. Each of the pinions 108 and 109 is mounted within a support block, such as shown at 111 in drawing FIG. 16. Further, in order to provide for manual adjustment, pinion 109 is connected to operating handle 112 having a lower end extending through the block 111.

In the use of the clamp assembly 95, the clamp is mounted to the extendible member of the stanchion by engaging the mounting pins within the keyhole openings 96. Thereafter, the stanchion is placed in position and adjusted such that the extendible member of the stanchion engages the stacked cargo at "C1" and "C3". Thereafter, the handle 112 of the clamp assembly 95 is operated to extend the clamping plate 100 into engagement with the cargo "C2" to thereby prevent movement of the cargo.

It should be noted that in some embodiments, the clamp assembly 95 may be selectively mounted to either flange 71 or 72 of the stanchion. In this respect, keyhole openings would be provided in spaced relationship along the vertical extent of the flange 71 in the same manner as shown in the drawing figures with respect to flange 72.

With specific reference to FIGS. 17–21, a second embodiment of the stanchion in accordance with the invention is disclosed. The features or elements of this embodiment which are common to the embodiment described with respect to FIGS. 1–16 will have the same reference number with the inclusion of the letter "A". In this embodiment, the adjustable stanchion 70A includes an outer or rear flange 71A which is formed as part of a fixed stanchion member 77A. The fixed stanchion member, as with the previous embodiment, includes an elongated generally open channel 73A and a web 76A which extends to a flange 72A of a adjustable stanchion member 83A having a web 82A extending toward the flange 71A of the fixed stanchion member. The two webs 76A and 82A are joined utilizing diagonal slots 84A through which extend fasteners 85A. The stanchion includes an upper locking pin 78A and a lower locking pin 79A which are similar to those discussed with respect to the previous embodiment.

Figure 19:
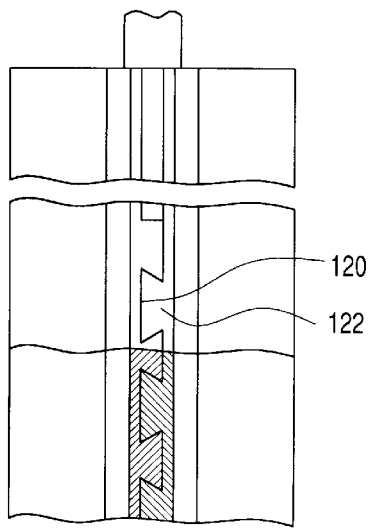
FIG. 19 is an enlarged cross-sectional view taken along line 19—19 of FIG. 17.
Figure 20:
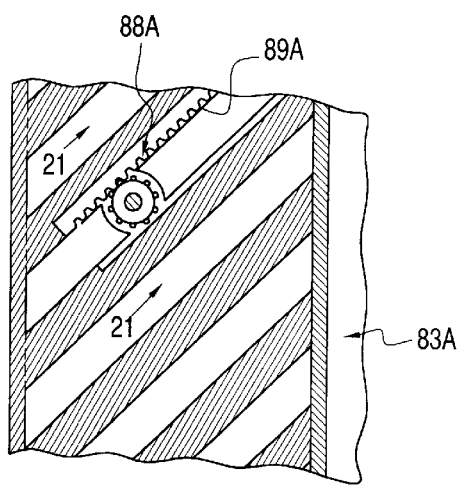
FIG. 20 is a cross-sectional view showing an adjustment mechanism for moving the extendible member of the stanchion of FIG. 17 relative to the fixed member.
Figure 21:
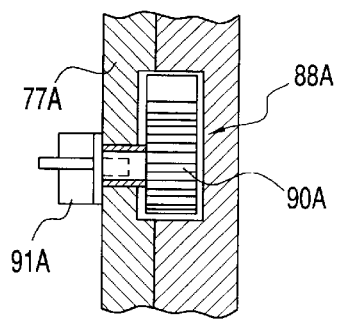
FIG. 21 is a cross-sectional view taken along line 21—21 of FIG. 20.
Figure 33:
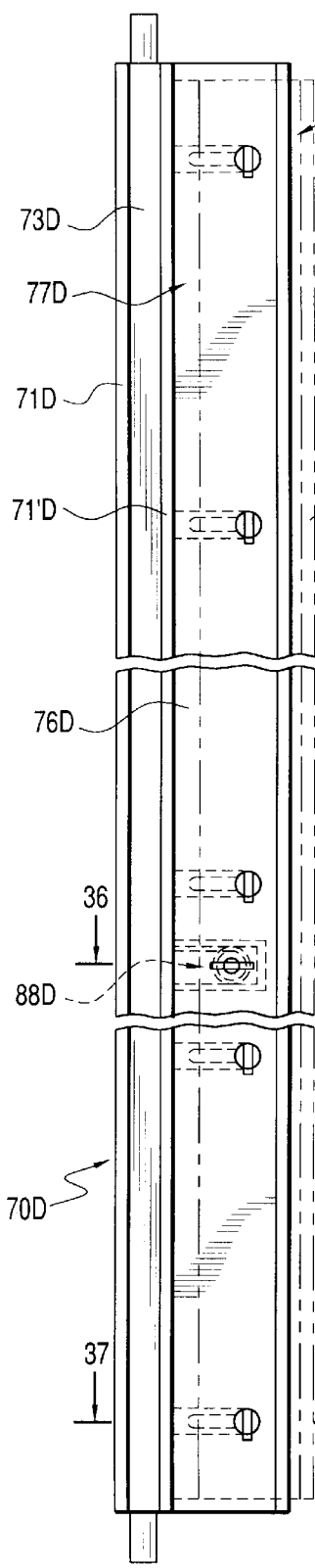
FIG. 33 is yet another embodiment of adjustable stanchion in accordance with the teachings of the present invention.
Figure 34:
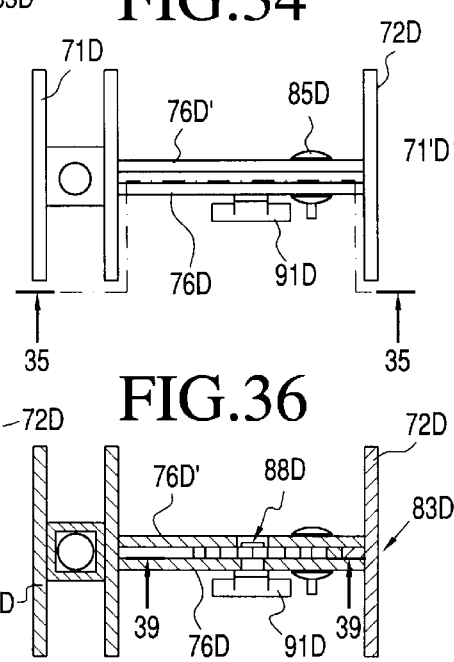
FIG. 34 is a top plan view of the stanchion of FIG. 33.
Figure 36:
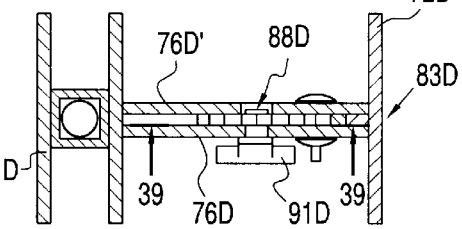
FIG. 36 is a cross-sectional view taken along line 36—36 of FIG. 33.
Figure 37:
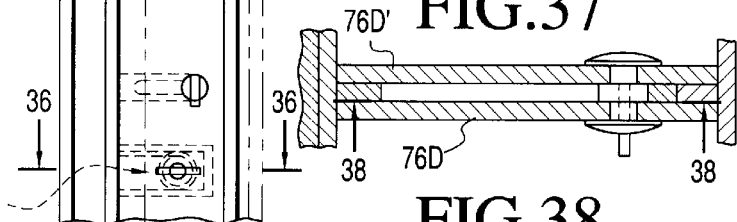
FIG. 37 is a cross-sectional view taken along line 37—37 of FIG. 33.
Figure 38:
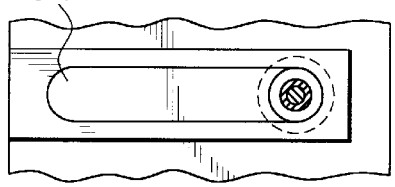
FIG. 38 is a view taken along line 38—38 of FIG. 37.
Figure 39:
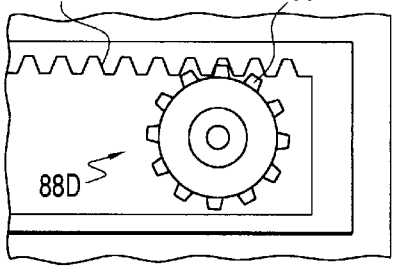
FIG. 39 is an enlarged view showing an adjustment mechanism for the stanchion of FIG. 33.
Figure 35:
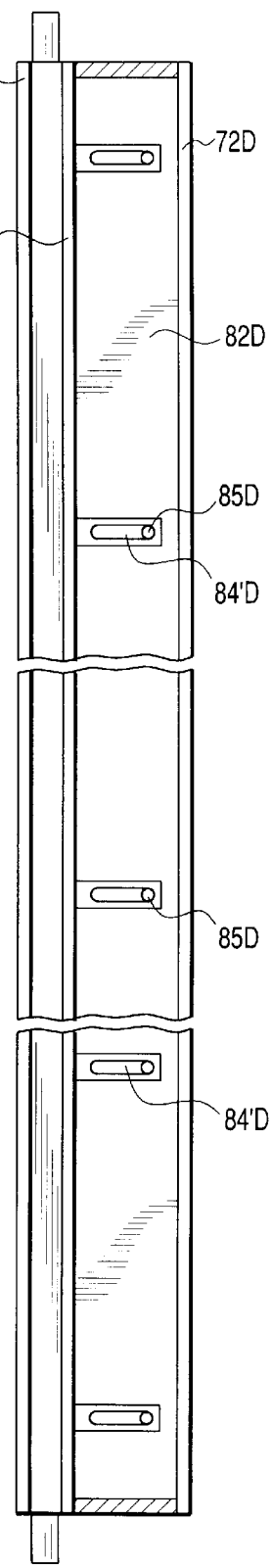
FIG. 35 is a view taken along line 35—35 of FIG. 34.

With the present embodiment, as opposed to having the angled edges 80 and 81 disclosed in the previous embodiment, the present embodiment incorporates a plurality of interfitting inclined grooves and rails which permit a sliding movement of the extendable stanchion member 83A relative to the fixed stanchion member 77A. As shown in FIG. 19, each of the inner surfaces of the webs of the stanchion members are provided with a series of spaced grooves 120 which are undercut at their edges and in which are slidingly received conformingly shaped rails 122, of the opposite stanchion member. Therefore, each stanchion member includes a plurality of angled slots or grooves 120 and a plurality of spaced rails 122 such that when the two members are engaged with one another, the two members slide relative to one another in a vertical and horizontal direction, being retained in assembled relationship with respect to one another by the interlocking sliding movement of the rails of each member within the opposing grooves of the opposite webs.

In the present embodiment, an adjustment mechanism 88A is provided which is similar to that disclosed with respect to the previous embodiment. A rack 89A is provided along one of the inclined rails 122 of the moveable stanchion member 83A which is engageable by a pinion 90A carried by the fixed stanchion member 77A, with the pinion being operable by a handle 91A positioned exteriorly of the stanchion.

In use of the stanchion of the embodiment of FIGS. 17–21, the stanchion is placed in upper and lower guide rails or tracks "G1" and "G2" closely adjacent to cargo to be secured.

Thereafter, the adjustable or extendible stanchion member 83A is maneuvered using the adjustment mechanism 88A so as to bring the flange 72A of the extendible stanchion member 83A into engagement with cargo. As with the previous embodiment, either of the flanges 71A and 72A may be provided with a plurality of openings for purposes of supporting a clamping assembly similar to that described at 95 with respect to the previous embodiment.

With specific reference to FIGS. 22–26, another embodiment of the invention is shown. In this embodiment, the elements of the adjustable stanchion having the same features as those of the embodiment described with respect to FIGS. 1–16 will have the same reference numbers with the addition of the letter "B". The stanchion 70B includes a fixed member 77B having an outer flange 71B and a web 76B extending from an elongated channel 71B toward the flange 73B of the extendible stanchion member 83B. The extendible stanchion member includes a web 82B having a plurality of inclined edges 81B similar to that described with respect to the embodiment of FIG. 1 with the exception that, in the embodiment shown, the inclines 81B are made in the total thickness of the web as opposed to being made in only a portion of the thickness of the web, as was the case with the embodiment of FIG. 1.

In the present embodiment, the extendible stanchion member 83B is designed to extend horizontally without any vertical component of movement, as was not the case in the previous embodiments. To accomplish this, the adjustment mechanism 88B of the present embodiment includes a plurality of wedge members 125 which are movably mounted to the fixed stanchion member 77B so as to be in opposing relationship with respect to the inclined edges 81B of the movable stanchion member 83B. Each of the wedges is mounted by a pair of locking pins 126 through slots 127 provided in the web 76B of the fixed stanchion member to an adjustment slide 130. The adjustment mechanism further includes a rack 89B formed along a portion of the slide 130 which is engageable by a pinion 90B mounted to the web 76B of the fixed stanchion member 77B. The pinion is operated by a handle 91B. As the pinion is rotated relative to the rack 89B, the slide 130 will carry the wedge blocks 125 upwardly relative to the inclined surfaces 81B of the extendible member of the stanchion. The extendible member of the stanchion and the fixed member of the stanchion are retained together in sliding relationship by a plurality of pins 85B which are slidable within slots 84'B formed horizontally in spaced relationship in the extendible member of the stanchion. Because of this connection, the extendible member of the stanchion may only move horizontally relative to the fixed member of the stanchion when being adjusted. Therefore, the vertical sliding movement between the wedge blocks 125 and the surfaces 81B cause a horizontal shifting of the extendible member of the stanchion so that the flange 72B thereof will engage cargo.

In the present embodiment, keyhole openings, as shown with respect to the embodiment of FIG. 1, may be provided in either or both of the flanges 71B and 72B for purposes of supporting a clamp assembly, such as 95.

With specific reference to FIGS. 27–32 a further embodiment of the present invention is disclosed. In this embodiment, the elements of the adjustable stanchion which are the same as the elements of the previous embodiments are designated with the same reference numbers followed by the letter "C". The stanchion 70C includes a fixed stanchion member 77C defined by an outer flange 71C which is connected to a pair of webs 76C and 76C' which are spaced from one another and which extend toward a flange 72C of an extendible stanchion member 83C. The extendible stanchion member 83C further includes a single web 82C which extends from the flange 72C between the spaced webs 76C and 76C' of the fixed stanchion member. In the present embodiment, the inner edge 81C of the moveable stanchion member is tapered from the upper portion thereof towards the lower portion thereof and includes a rack 89C mounted along a portion thereof, which rack is engageable by a pinion 90C of an adjustment mechanism 88C. The adjustment mechanism further includes an operating handle 91C. As noted, the pinion 90C is positioned between the two webs 76C and 76C' of the fixed stanchion member. The extendible stanchion member is slidably connected to the fixed stanchion member by way of elongated slots 84C' formed in the single web 82C thereof and by way of bolts or other connecting pins 85C which extend through the slots and through openings in the webs of the fixed stanchion member.

In the present embodiment, the extension of the extendable stanchion member 83C is accomplished with both a vertical and horizontal component, such that the height of the extendible stanchion member is less than that of the fixed stanchion member. As with the previous embodiments, either or both of the flanges 72C and 71C may be provided with openings or with other features for supporting an adjustable clamp assembly, such as shown at 95 in FIG. 2.

With specific reference to FIGS. 33–39, another embodiment of the present invention for an adjustable stanchion is disclosed. In this embodiment, the elements of the invention having the same features as the previous embodiments have the same reference number with the addition of the letter "D". The stanchion 70D of this embodiment is specifically constructed so as to allow the extendible member 83D of the stanchion to extend horizontally without any vertical component when being adjusted.

The stanchion 70D includes a fixed member 77D including a rear flange 71D, an open channel member 73D and a double web formed of numbers 76D and 76D' which are spaced relative to one another in order to receive a web 82D of the extendible stanchion member 83D. In the present embodiment, a second flange 71'D is provided parallel to the flange 71D on an opposite side of the channel 73D to provide for further strengthening of the stanchion.

In the present embodiment, an adjustment mechanism 88D is provided including an operating handle 91D which is connected to a pinion 90D mounted intermediate the webs 76D and 76D' of the fixed stanchion member. The pinion cooperates with a rack 89D formed along openings 84'D provided horizontally within the web 82D of the extendible stanchion member 83D. In order to control the horizontal extension of the extendible stanchion member 83D, a plurality of slots 84'D are provided in vertically spaced relationship along the height of the web 82D of the extendible stanchion member 83D through which guide pins or bolts 85D extend.

As with the previous embodiments, keyhole openings may be provided in either of the flanges 71D or 72D of the fixed and extendible stanchion members in order to support clamping assemblies such as described with respect to the first embodiment.

With specific reference to FIGS. 40–44, another embodiment of the present invention is shown. In this embodiment, the elements of the stanchion having the same features of the elements of the previous stanchions are referenced with the same numbers together with the letter "E". The stanchion 70E is constructed to provide for a horizontal adjustment without any vertical component and is similar to the embodiment disclosed with respect to stanchion 70B shown in FIGS. 22–26. In this respect, the fixed member 77E of the stanchion includes a flange 71E and an elongated channel 73E. As with the previous embodiment, the stanchion is further reinforced by a second flange 71'E parallel to the flange 71E and which is spaced on the opposite side of the channel 73E. A web 76E extends from the flange 71'E toward the cargo contacting flange 72E of the extendible stanchion member 83E.

In the present embodiment, a plurality of slots 84E are provided in the web 76E in vertically spaced relationship with respect to one another and receive elongated horizontal keys 132 which are integrally formed or secured with the web 82E of the extendible stanchion member 83E. Extension of the extendible stanchion member is accomplished by providing a plurality of vertically spaced tapered wedge blocks 125E which are secured by fasteners 126E to a vertical slide member 130E mounted to slide relative to an elongated slot 127E formed in the web 126E of the fixed stanchion member 177E. Adjustment is controlled by the engagement of a pinion 90E with respect to a rack 89E provided along an edge surface of the slide 130E with the adjustment mechanism including a handle 91E. As the slide member 130E is moved vertically, the wedge members contact tapered edge surfaces 81E provided along the length of the web 82E and thereby force a horizontal component of movement on the extendible stanchion member with the elongated keys 132 allowing only a horizontal movement and no vertical movement as the extendible member of the stanchion is moved outwardly, as shown in dotted line in FIG. 41.

As with the previous embodiments, the present invention may also include openings or other means for supporting a separate clamp mechanism, such as shown at 95 with respect to the embodiment shown in FIG. 2.

In an effort to enable the stanchions of the invention to be moved relatively easy by a single individual, any of the embodiments of the stanchions of the present invention may be supported relative to the guide tracks "G1" and "G2" by roller carriages or carriers which are of a size to travel within the guide tracks "G1" and/or "G2". In this respect, and with specific reference to FIGS. 45–49 and FIG. 54, a further embodiment of the present invention is disclosed. In this embodiment, the carriages will be shown as supporting the stanchions 70F from the upper guide track "G1", it being understood that the stanchions could also be supported by carriages mounted within the lower guide tracks or with carriages in both the upper and lower guide tracks. In the present embodiment, the components of the stanchions which are similar to those of the previous embodiments have the same reference number with the addition of the letter "F".

The stanchion 70F is shown as having the general structure as disclosed with respect to the embodiment shown in FIG. 1 and includes a fixed stanchion member 77F including a rear flange 71F, a channel 73F in which a locking pin adjusting mechanism extends, as will be described, and which further includes a moveable stanchion member 83F including a cargo contacting flange 72F from which extends a web 82F. The web 82F is provided with a series of tapered surfaces 81F which cooperate with tapered surfaces 80F provided along the web 76F of the fixed stanchion member 77F.

Slots are provided along the slots 84'F along the web 82F of the extendible stanchion member through which guide pins 85F extend to secure the extendible stanchion member relative to the fixed stanchion member.

Figure 45:
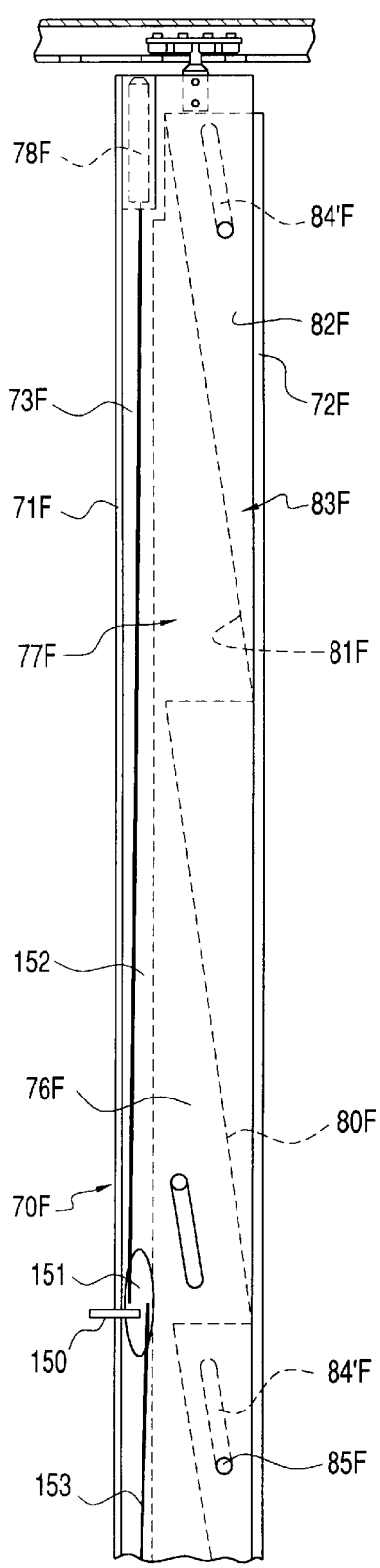
FIG. 45 is the right side view of the stanchion similar to that shown in FIG. 1 having a modified locking mechanism and showing the stanchion carried by a carriage assembly moveable along an upper guide track.
Figure 46:
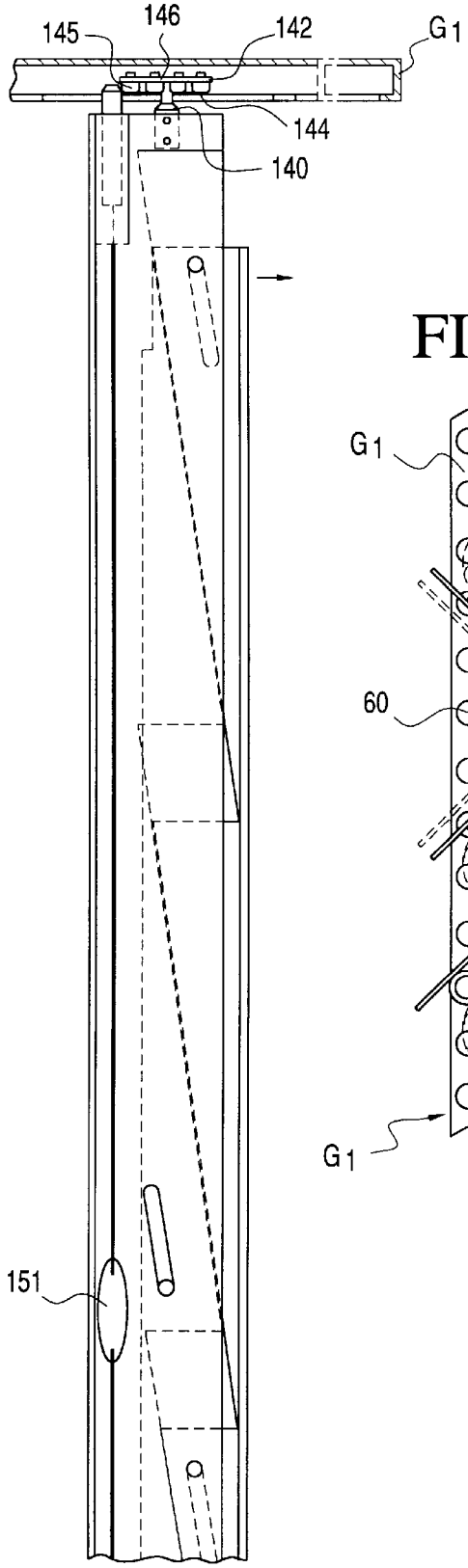
FIG. 46 is a view similar to FIG. 45 showing the extendible member of the stanchion being moved outwardly from the fixed member of the stanchion.

In the drawings of FIGS. 45 and 46, the outer surface component of the web 82F of the extendible stanchion member has been removed in order to show a manually operating locking mechanism for controlling the movement of the upper 78F and lower pins.

In the present embodiment, the stanchion is shown as being suspended from a spindle 140 which is secured to the upper portion of the web 76F to a roller carriage 142 mounted within the guide track "G1". The roller carriage includes a plurality of roller elements 144 which are mounted on opposite sides of a central opening or channel 143 defined between the flanges 61 and 62 of the guide track, such that the spindle 140 is allowed to extend through the guide channel 143. The carriage rollers 144 are mounted within carriers 145 connected to a carriage base plate 146.

Because of the carriage, the stanchions may be easily pulled along the guide track "G1" to any desired position. When the stanchion is moved to a desired position, the locking pins may be extended by manipulation of a locking linkage system including a handle 150 extending from a crank 151 to which two extension rods 152 and 153 extend. The rod 152 is connected to locking pin 78F along the upper portion of the stanchion and the linkage 153 is connected to the locking pin at the bottom of the stanchion (not shown). By rotation of the handle and thus the crank 151, the pins will be extended into the openings 60 in the guide tracks "G1" and "G2" thereby locking the stanchion in the desired location. Thereafter, the extendible member 83F of the stanchion is extended utilizing adjustment mechanisms as previously described so that the cargo engaging flange 72F is engageable with cargo. In FIG. 45, the stanchion is unlocked so that it can be moved along the track "G1" whereas in FIG. 46, the stanchion is locked in position by the extension of the locking pins. FIG. 47 is an illustrational view showing the stanchion being maneuvered relative to the guide track "G1" so as to change the orientation of the stanchion, with the movement of the extension member of the stanchion being shown in dotted line.

As with the previous embodiments, both the flanges 71F and 72F may be provided with means for supporting a movable clamp assembly such as previously described at 95 with respect to the embodiment of FIG. 1.

Figure 48:
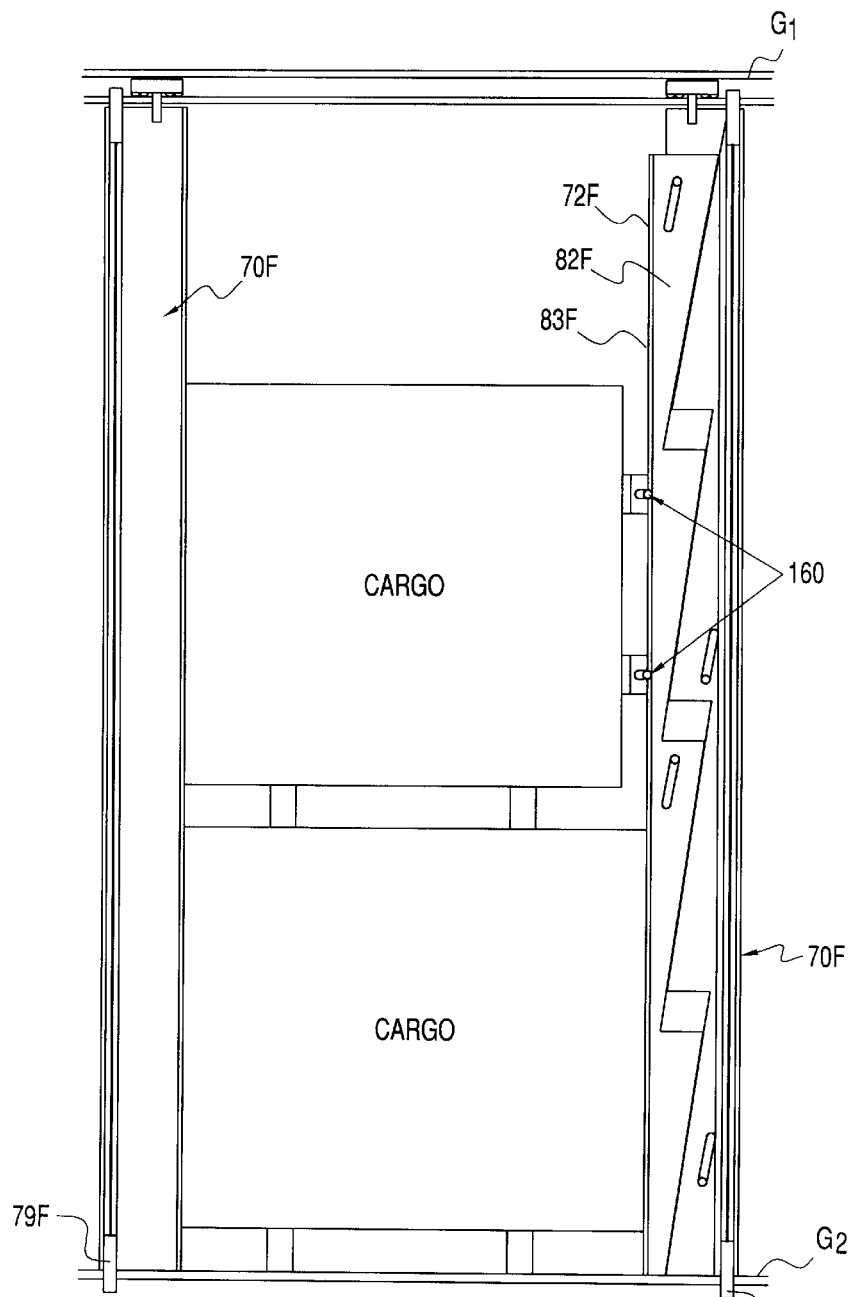
FIG. 48 is a side illustrational view of the stanchion of FIG. 45 used to secure stacked cargo and showing the use of auxiliary clamps secured to the extendible member of the stanchion in order to engage cargo which is not vertically aligned when stacked.

With specific reference to FIG. 48, a modified type of clamp assembly is shown for use in stabilizing cargo that is not vertically aligned relative to one of the stanchions of the present invention. The modified clamp assembly 160 is shown more specifically in FIGS. 50–53. The clamp 160 may also be used interchangeably with the clamps 95 with respect to all embodiments of the invention. In FIG. 48, the outer surface of the web 82F has been removed to show the interaction between the two stanchion members as discussed with respect to the embodiment shown in FIG. 45.

Each clamp 160 includes a plurality of support pins 161 having enlarged heads 162 such that the pins may be inserted within the keyshaped openings provided in the flange 72F, as previously described with respect to other embodiments of the invention. The enlarged heads 162 prevent the withdrawal of the clamp once mounted in position relative to the adjustable member 83F of the stanchion.

Each clamp assembly 160 is provided with a pair of wedge elements 164 and 165 which are slidable relative to one another along their diagonal faces 166 and 167, respectively. As shown, the diagonal face 167 includes ridges 168 which slide within grooves 169 formed on edges of the diagonal surface 167. The mounting pins extend from a rear surface 170 of the wedge 165. To extend the wedge 164 relative to the wedge 165, a screw or bolt 172 is mounted through a pivotable joint 174 inside of the wedge 165 and extends to a distal end 176 pivotally mounted to the wedge 164, as shown at 178. By adjusting the bolt relative to the threaded pivot joint 174, the wedge 164 is moved relative to the wedge 165 to thereby extend the wedge 164 toward cargo, as shown in FIG. 48.

Figure 49:
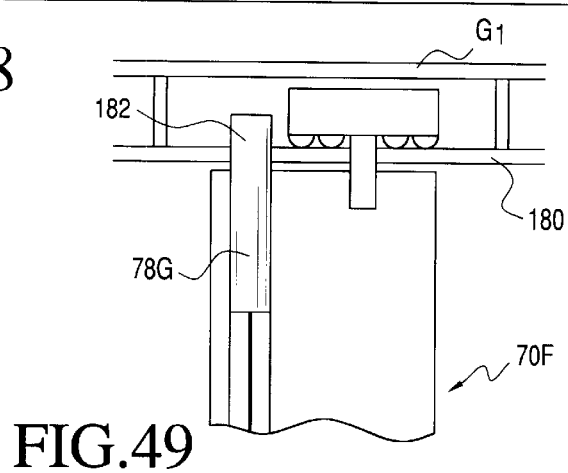
FIG. 49 is a partial cross-sectional view of a modified embodiment of the stanchion of FIG. 45 showing a series of teeth provided along the guide track which teeth are engageable by a toothed locking pin of the stanchion.
Figure 50:
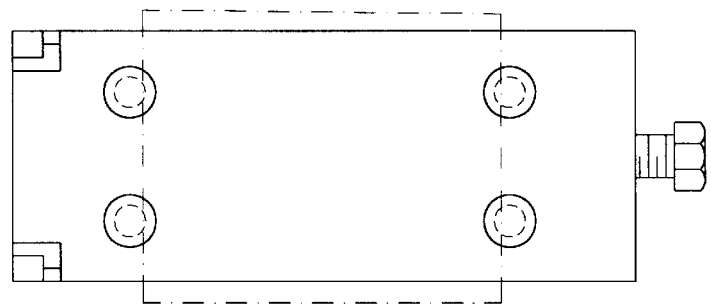
FIG. 50 is a front elevational view of the locking clamps shown in FIG. 48.
Figure 51:
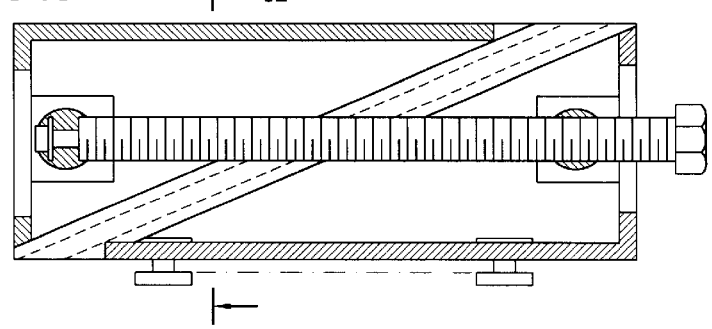
FIG. 51 is a cross-sectional view of the clamp of FIG. 50 taken from the top of the clamp.
Figure 52:
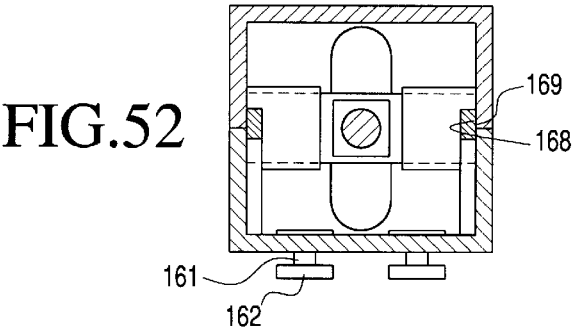
FIG. 52 is a cross-sectional view taken along line 52—52 of FIG. 51.
Figure 53:
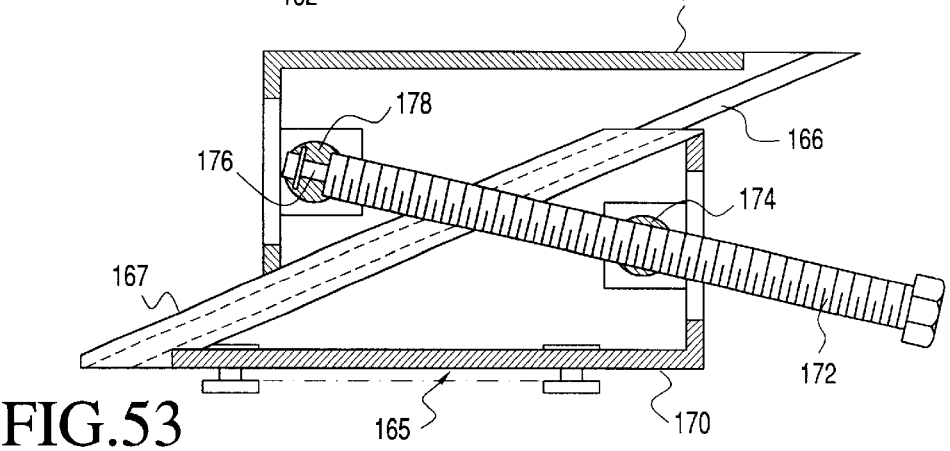
FIG. 53 is a view similar to the view of FIG. 51 showing the clamp being extended.

With specific reference to FIG. 49, a somewhat modified embodiment for locking the stanchions of the present invention relative to the guide tracks is disclosed. In this embodiment, the guide tracks are provided on opposite sides of the channels 143 therein with a series of teeth 180. In this embodiment, the locking pins 78G are provided with a series of teeth 182 which cooperatively engage the teeth 180 of the track to thereby lock the stanchion in place relative to the guide track.

Figure 54:
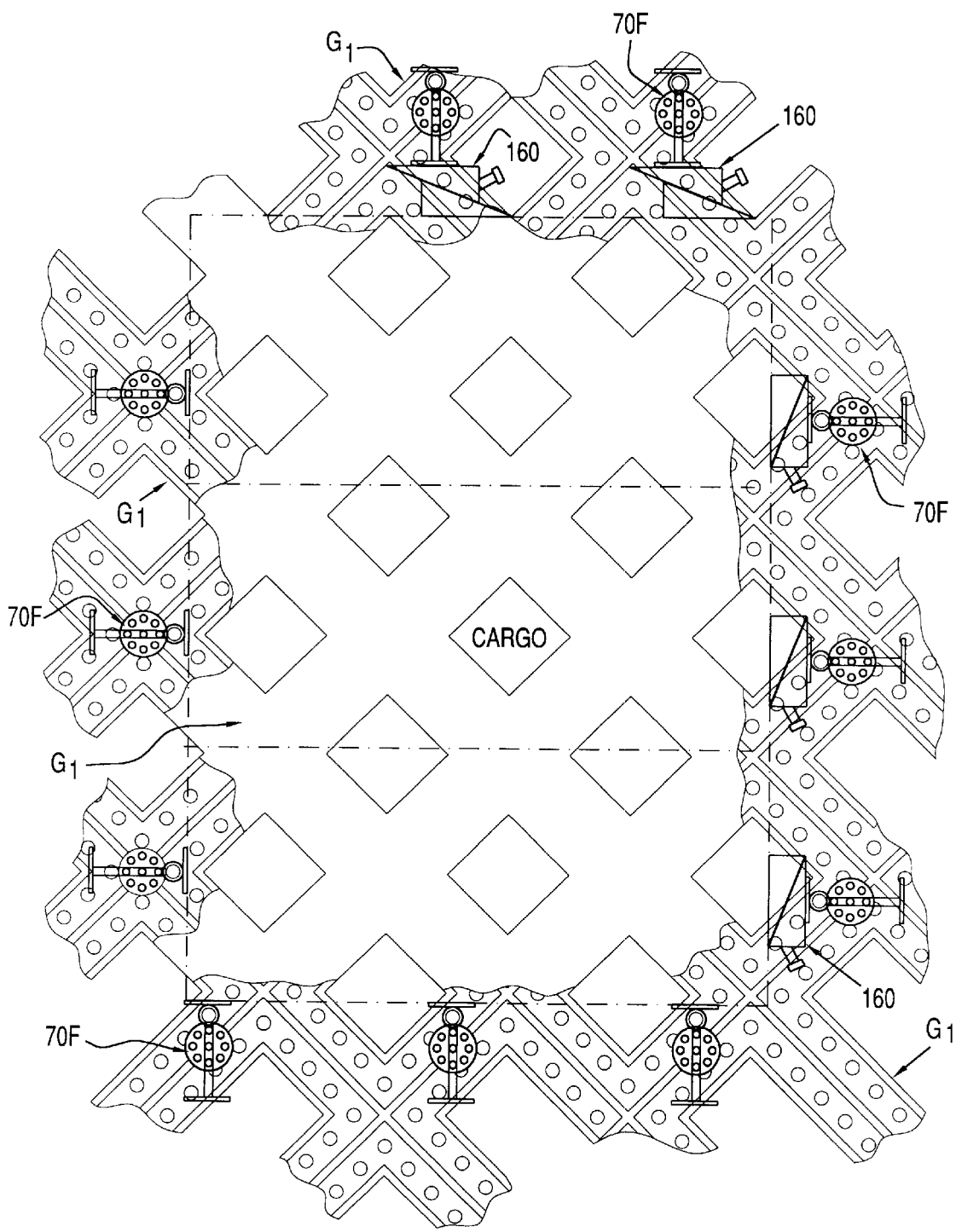
FIG. 54 is a top illustrational view showing the stanchions of FIG. 45 mounted in guide tracks similar to those shown in FIG. 47 which are arranged in generally parallel relationship in a grid pattern and showing the clamps of FIG. 50 used to secure cargo in cooperation with the stanchions.

With specific reference to FIG. 54, a top plan view of a cargo storage area is shown with the guide tracks "G1" being oriented in a square grid pattern in crossing diagonal relationship to one another. Pluralities of stanchions 70F are shown as being maneuvered and locked into place relative to the cargo in surrounding relationship therewith. Clamps 160 are shown as being adjusted as necessary to securely engage the cargo on all sides thereof to ensure that no cargo shifts during movement of the carrier vehicle.

The foregoing description of the preferred embodiments of the invention has been presented to illustrate the principles of the invention and not to limit the invention to the particular embodiments illustrated. It is intended that the scope of the invention be defined by all of the embodiments encompassed within the application including the following claims and their equivalents.

We claim:

1. A stanchion for use with a horizontal guide track system that supports the stanchion, the stanchion including a vertically extending body having a first vertical member having upper and lower ends, means extending from at least one of said upper and lower ends of said first vertical member for securing said first vertical member relative to the guide track system, a second vertical members, adjusting means for at least horizontally adjustably connecting said first and second vertical members to one another so that said second vertical member is selective horizontally extendable and retractable relative to said first vertical member.

2. The stanchion of claim 1 in which each of said first and second vertical members includes a vertical flange and at least one web member extending inwardly of said flange toward said vertical flange of the other of said first and second vertical members.

3. The stanchion of claim 2 in which each of said web members includes inclined surfaces slidably contacting said inclined edges surfaces of the other of said web members.

4. The stanchion of claim 1 including a carriage means, means for connecting said carriage means to said first vertical member, said carriage means being adapted to be mounted for movement along the guide track system.

5. The stanchion of claim 1 including at least one clamp assembly, at least one of said first and second vertical members having means for supporting said at least one clamp assembly, said clamp assembly including means for extending a clamping plate horizontally relative to said first and second vertical members when said first vertical member is secured to the guide track system.

6. The stanchion of claim 1 in which said first vertical member includes an outer vertical flange and at least one first web extending transversely to said vertical flange and toward said second vertical member, said second vertical member including a vertical flange having an outer object engaging surface and having at least one second web extending transversely to said vertical flange thereof toward said first vertical member, and means for retaining said at least one first web in sliding contact with said at least one second web whereby said webs reinforce said vertically extending body of the stanchion.

7. The stanchion of claim 6 wherein each of said first and second webs have opposing inner faces, at least one inclined surface formed along each of said inner faces, said first and second webs being retained in sliding contact such that said at least one inclined surface of said first web are slidingly engaged by said at least one inclined surface of said second web, whereby said second vertical member is vertically movable simultaneously as it is extended or retracted relative to said first vertical member.

8. The stanchion of claim 7 in which each of said first and second webs includes a plurality of vertically spaced inclined surfaces.

9. The stanchion of claim 8 including locking pin means extending from each of said upper and lower ends of said first vertical member for securing said vertically extending body of the stanchion to the guide track system.

10. The stanchion of claim 9 wherein said adjusting means includes a mechanical adjustment mechanism which is operable to control a degree of extension of said second vertical member relative to said first vertical member, said mechanical adjustment mechanism including a first component mounted to said first vertical member and a second component mounted to said second vertical member.

11. The stanchion of claim 10 wherein said first component is a mechanical rack having a first plurality of teeth and said second component is a mechanical pinion gear having a second plurality of teeth which intermesh with said first plurality of teeth.

12. The stanchion of claim 11 wherein said mechanical rack is provided along one of said inclined surfaces of said second vertical member and said pinion gear is mounted to said first vertical member.

13. The stanchion of claim 7 wherein each of said inner faces of said first and second webs includes a plurality of diagonally oriented rails and grooves, said rails and grooves of said second web being slideably interfitted with said rails and grooves of said first web.

14. The stanchion of claim 13 wherein said adjusting means includes a mechanical rack extending along one of said rails of said second web and a pinion gear mounted to said first vertical member and engaging said mechanical rack.

15. The stanchion of claim 6 wherein said first vertical member includes a pair of spaced first webs, said second web being slideably received between said pair of spaced first webs.

16. The stanchion of claim 15 wherein said second web has an inclined inner edge, and said adjusting means including means for engaging said inclined inner edge to thereby move said second vertical member simultaneously horizontally and vertically relative to said first vertical member.

17. The stanchion of claim 15 including an elongated opening in said second web, said means for adjusting including a mechanical rack within said elongated opening, and a pinion gear carried by at least one of said pair of spaced first webs for engaging said mechanical rack.

18. The stanchion of claim 6 including a plurality of generally horizontal slots formed in said first web and a plurality of generally horizontal key elements formed along said second web, said key elements being slideably received within said slots.

19. The stanchion of claim 18 in which said second web includes at least one inclined edge and said adjusting means includes a vertically moveable wedge member carried by said first web which is engageable with said at least one inclined edge.

20. A cargo hold down system including a stanchion and a horizontal guide track system including upper and lower vertically aligned guide tracks for supporting said stanchion, said stanchion including a vertically extending body having a first vertical member having upper and lower ends, said stanchion including a second vertical member, adjusting means for horizontally adjustably connecting said first and second vertical members to one another so that said second vertical member is selectively horizontally extendable and retractable relative to said first member, and locking means extending from said upper and lower ends of said first vertical member for securing said stanchion to said upper and lower guide tracks.

21. The cargo hold down system of claim 20 wherein each of said first and second vertical members includes a flange and at least one web member extending inwardly of said flange toward said flange of the other of said first and second vertical members.

22. The stanchion of claim 21 including carriage means, means for connecting said carriage means to said first vertical member so that said stanchion is pivotal relative to said carriage means, and said carriage means being adapted to be mounted for movement along one of said upper or lower guide tracks.

23. A method of securing cargo stored in an area including a guide track system including upper and lower guide tracks using a horizontal adjustable stanchion, the stanchion including a vertically extending body having a first vertical member having upper and lower ends, and means extending from at least one of the upper and lower ends of the first vertical member for securing the first vertical member relative to the guide track system, a second vertical member adjustably mounted so as to be extendible at least horizontally relative to the first vertical member, and adjusting means for adjusting the at least horizontal movement of the second vertical member relative to said first member, the method comprising the steps of:

A. moving the stanchion along the upper and lower guide tracks into proximity of cargo to be secured and with the second vertical member oriented toward the cargo;

B. locking the first vertical member to the upper and lower guide tracks to retain the stanchion in a fixed position, and C. thereafter, extending the second vertical member horizontally into abutting relationship with the cargo to thereby retain the cargo in position.

24. The method of claim 23 including simultaneously extending the second vertical member both horizontally and vertically from the first vertical member.

* * * * *